United States Patent Office 3,421,296
Patented Jan. 14, 1969

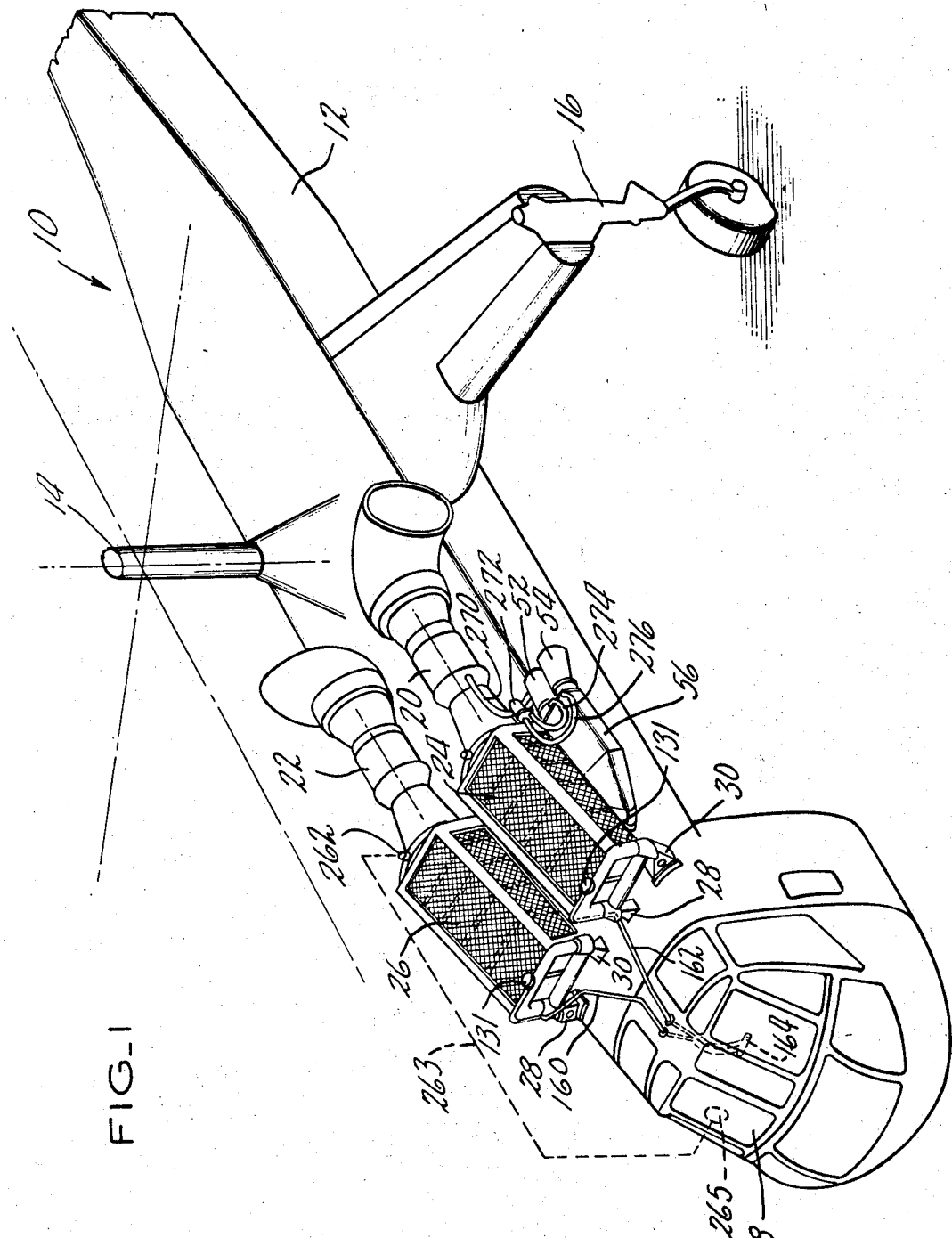

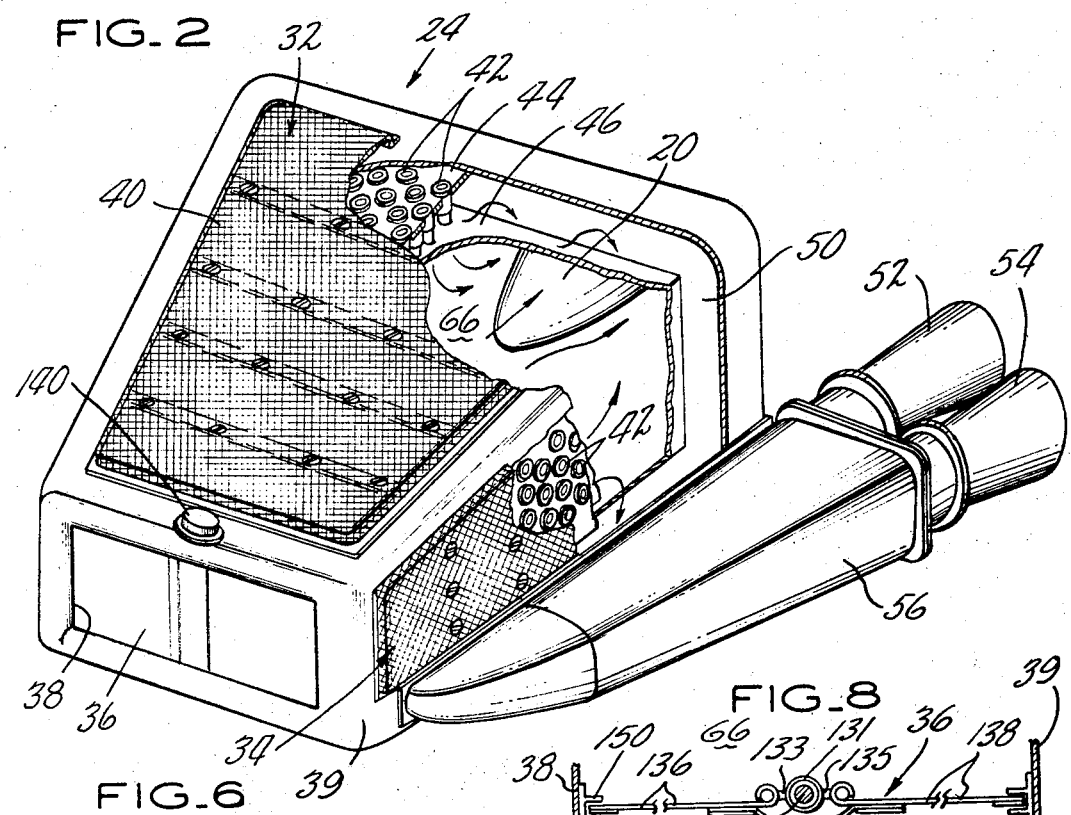
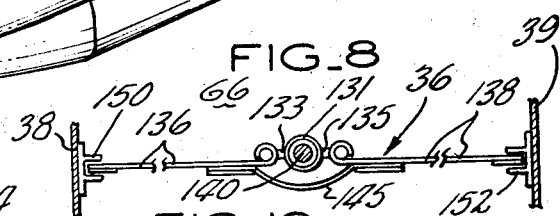
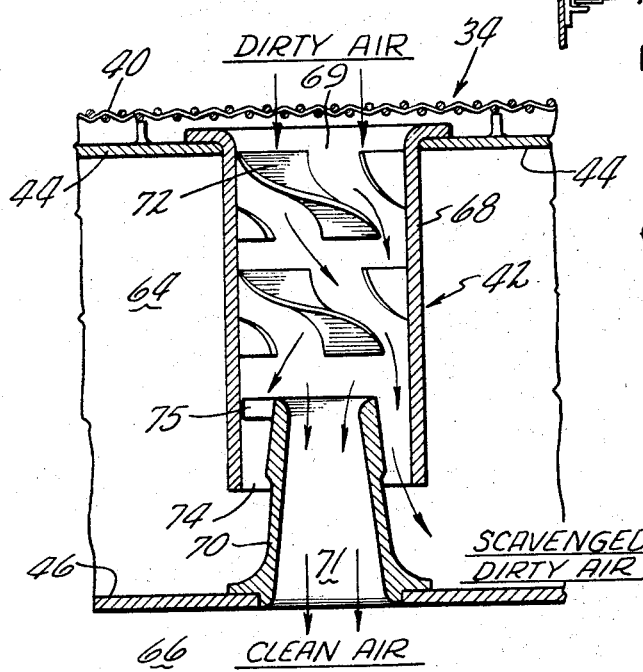
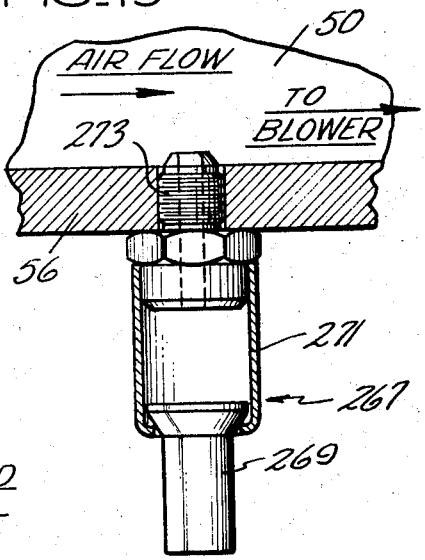

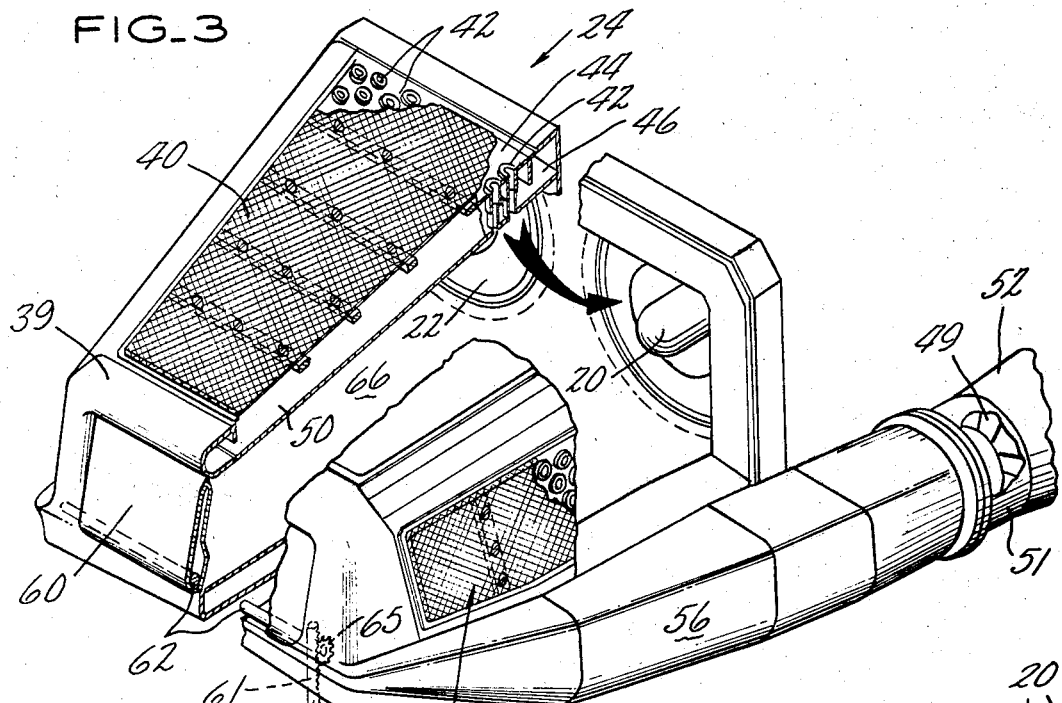
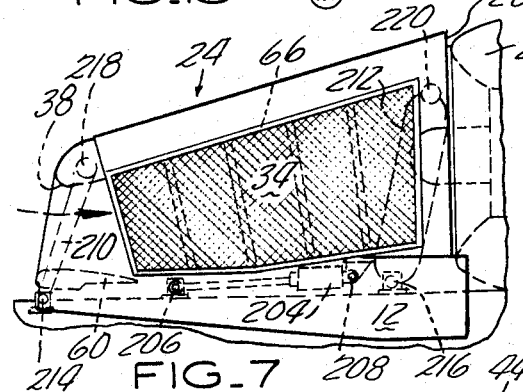
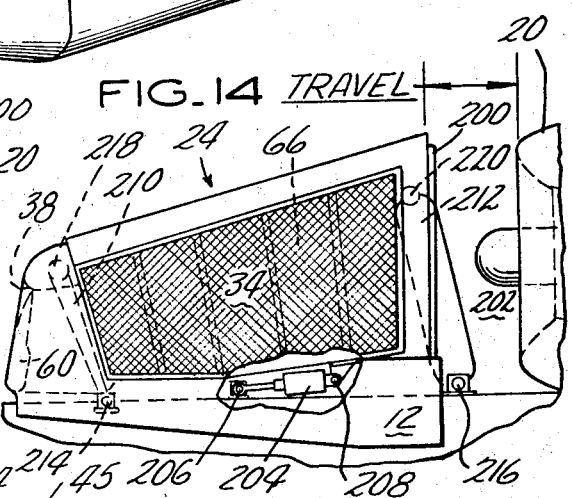
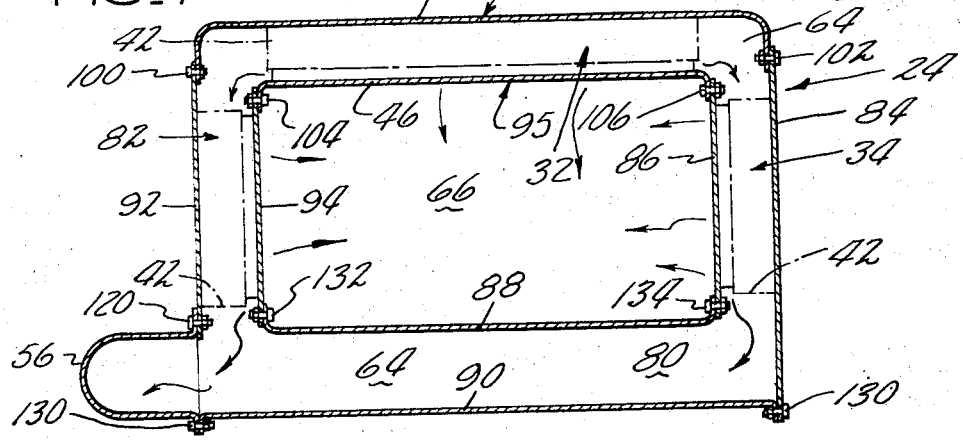

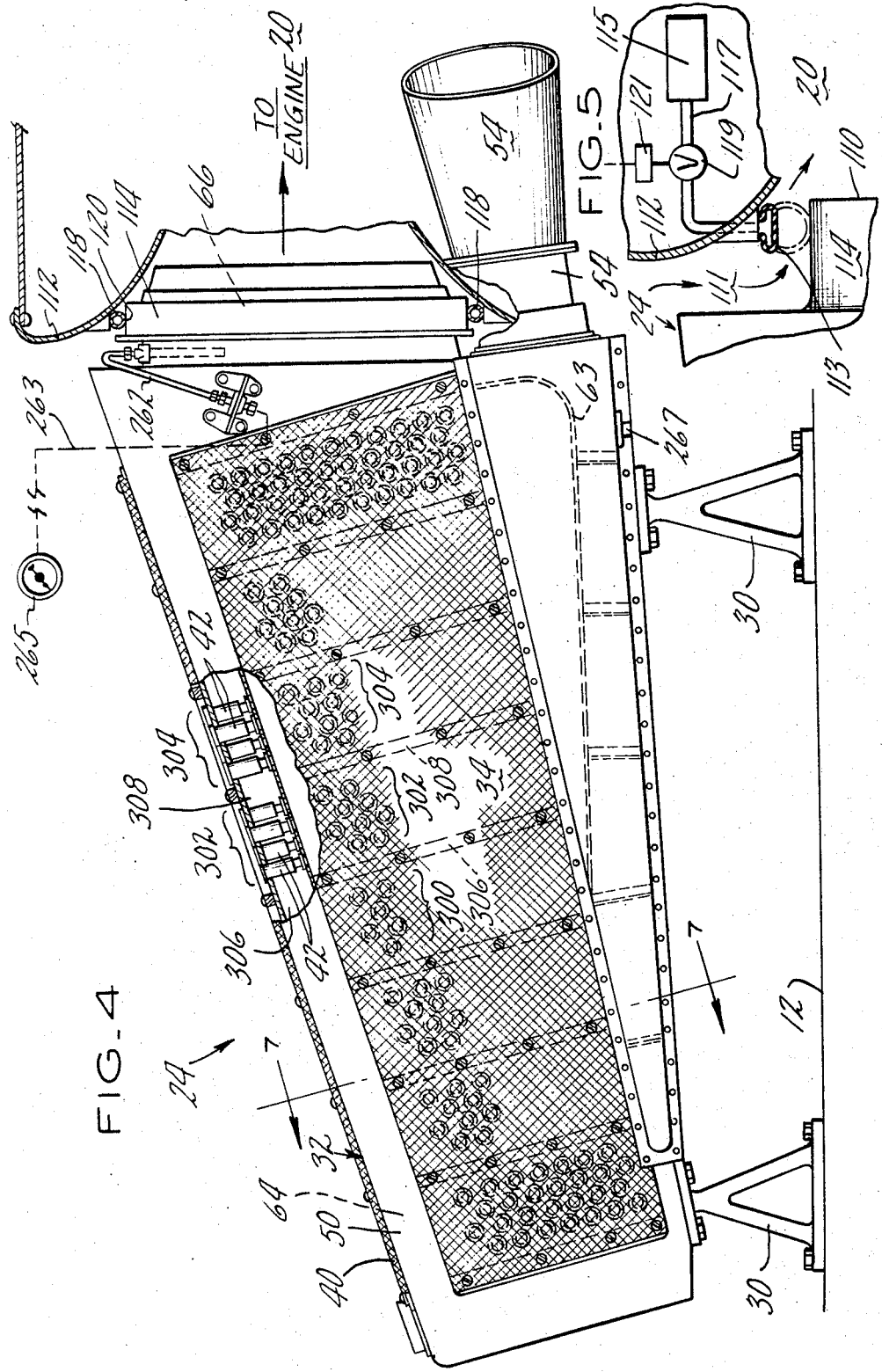

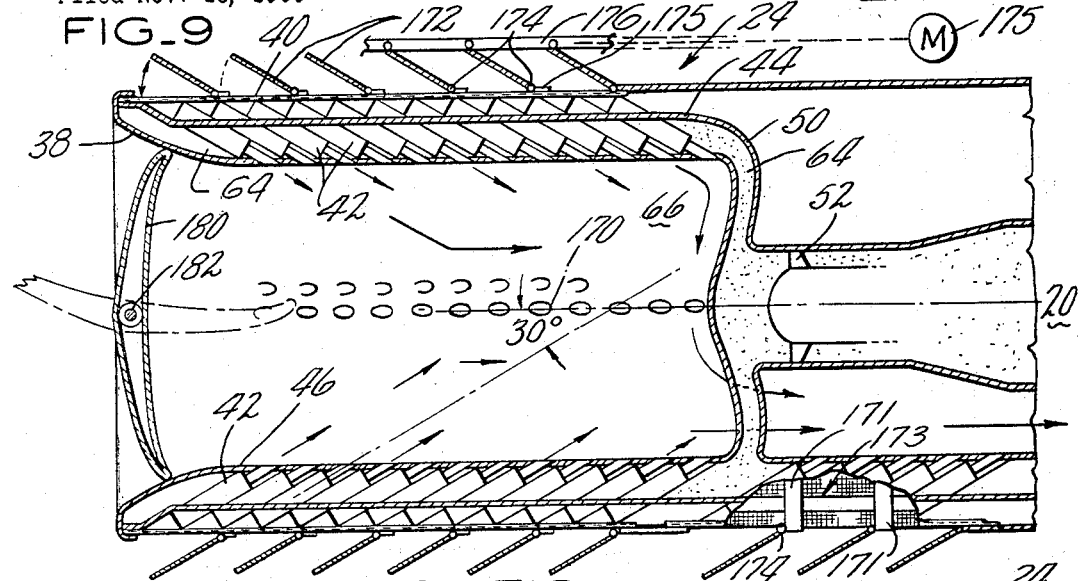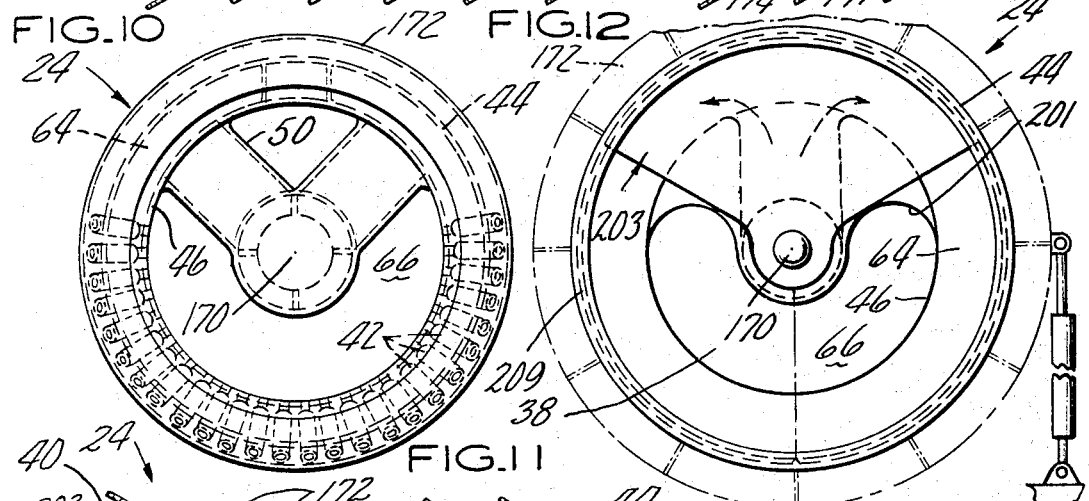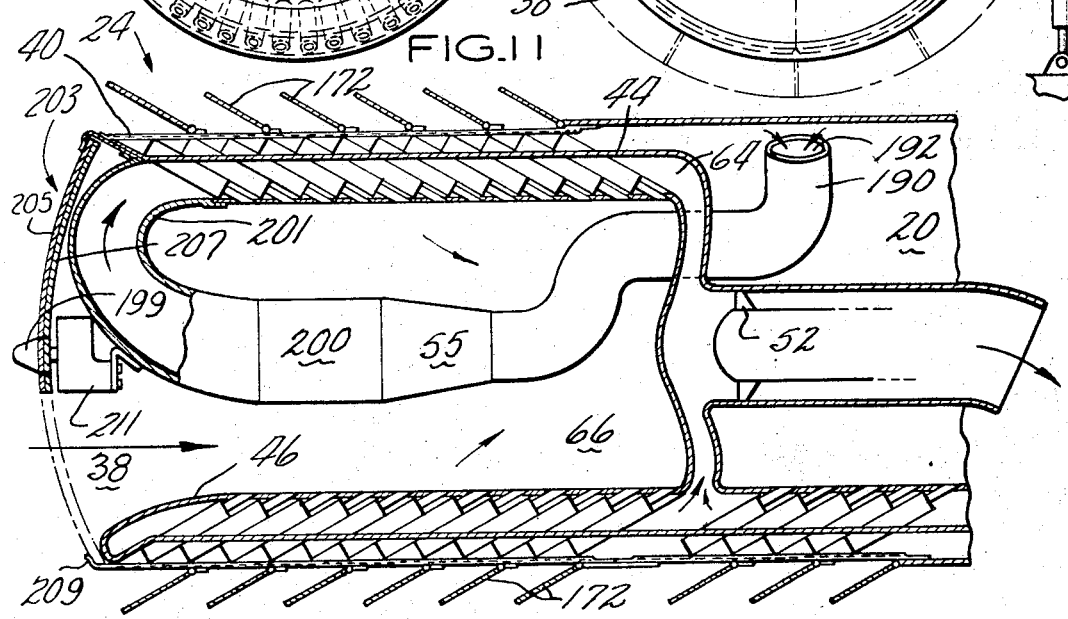

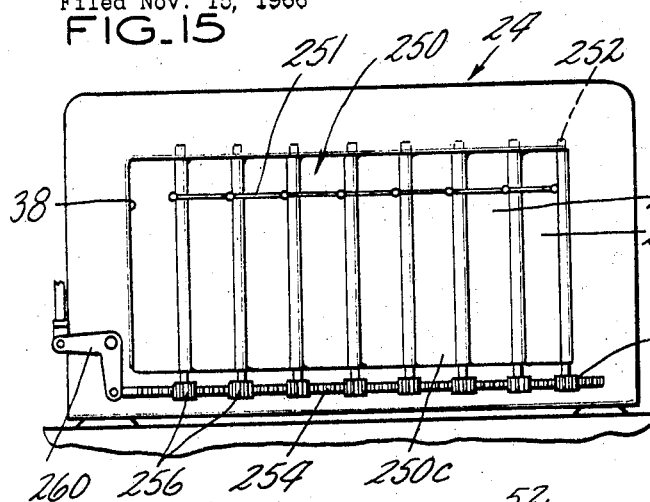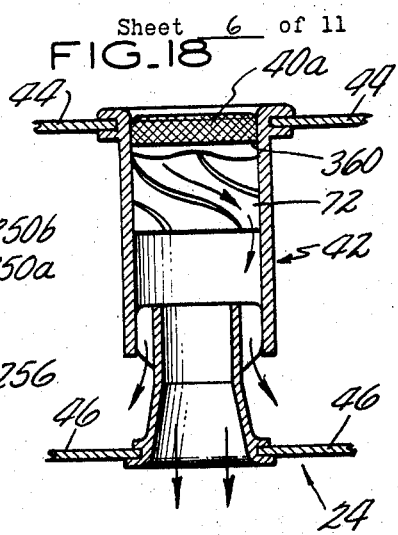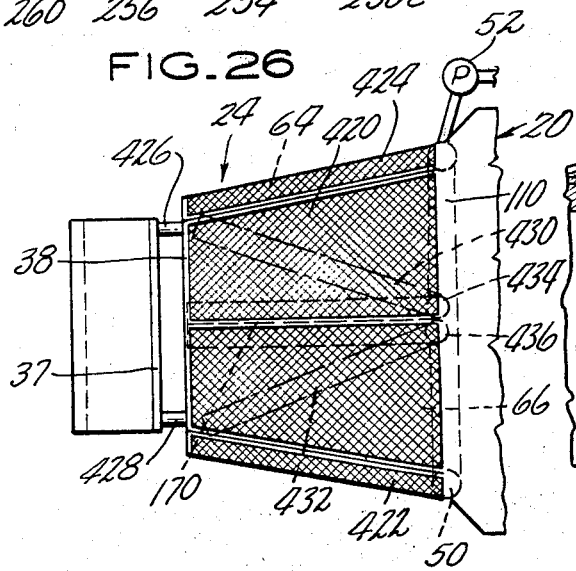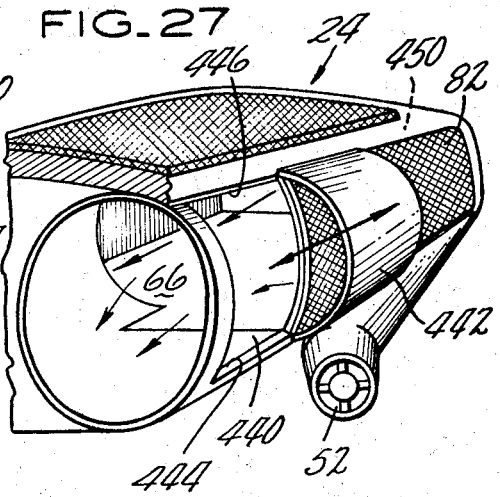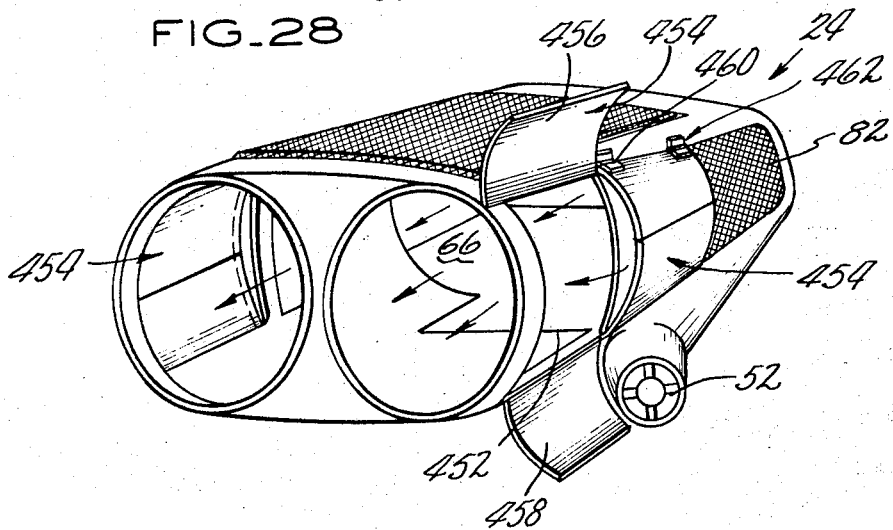

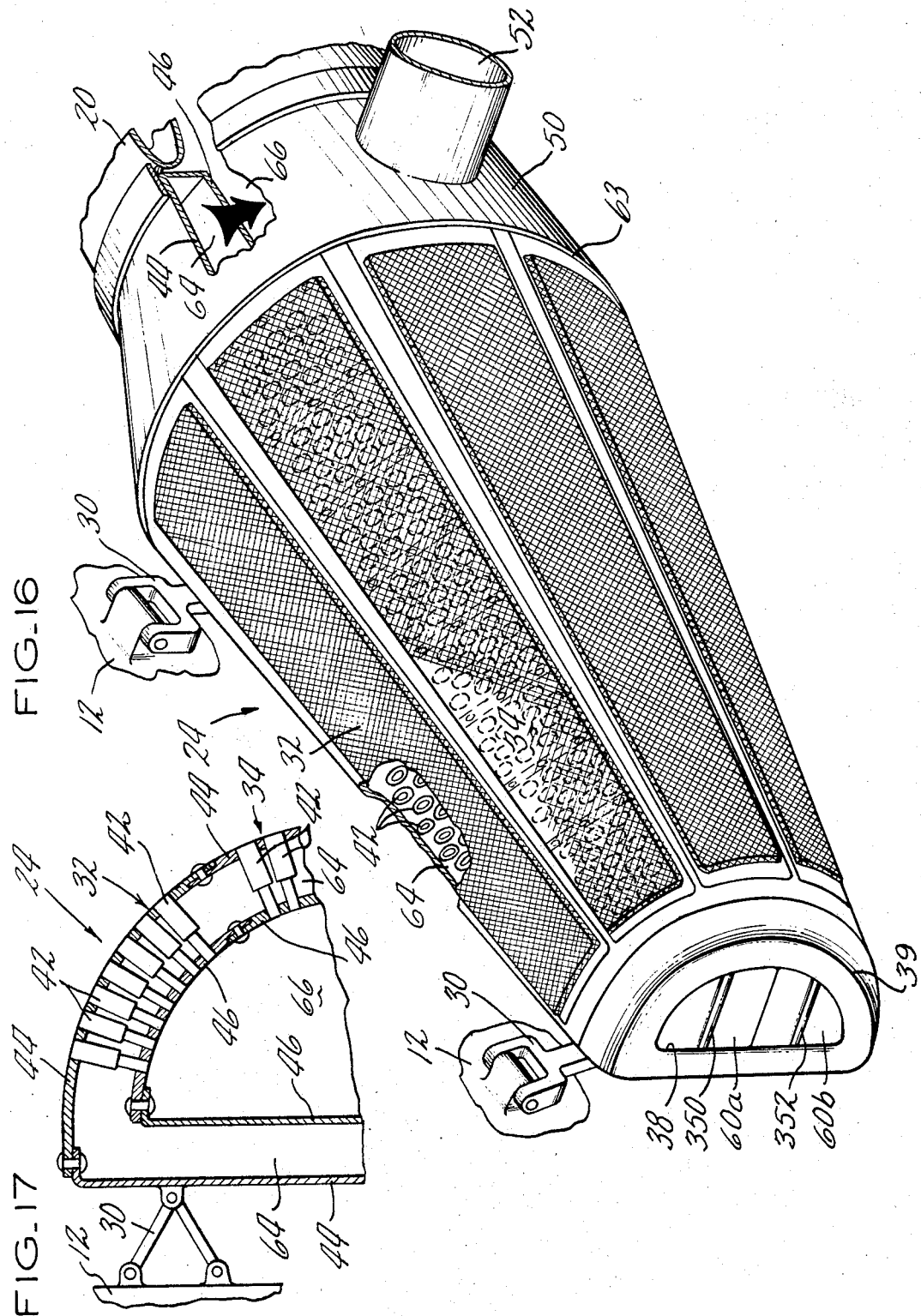

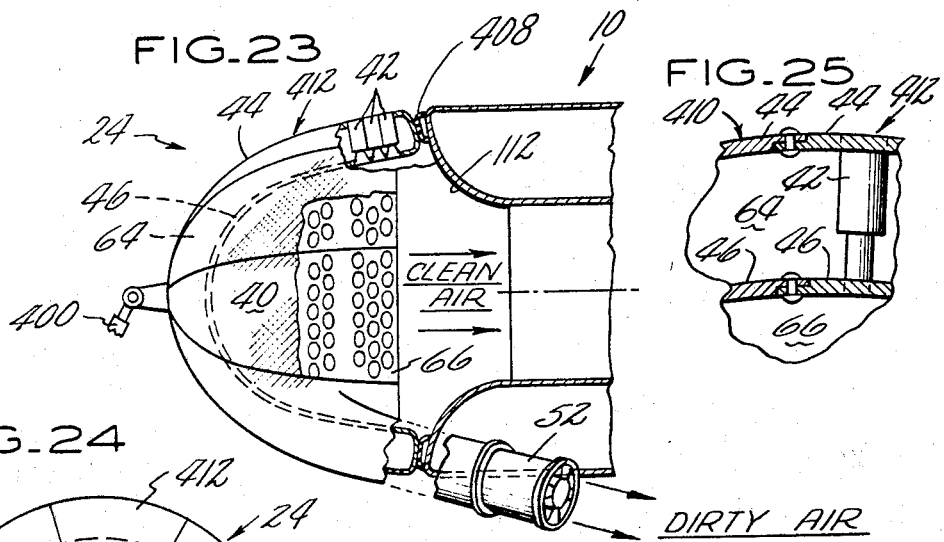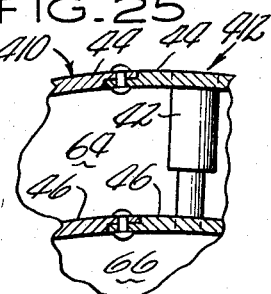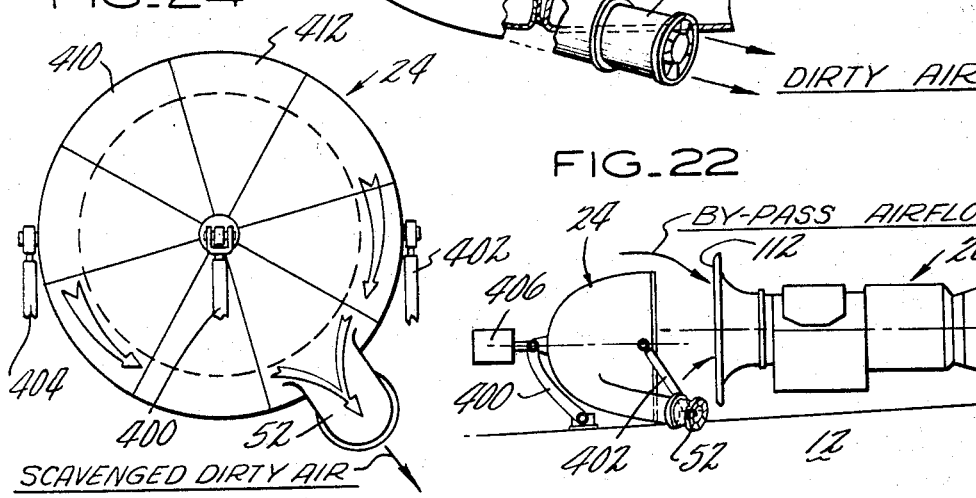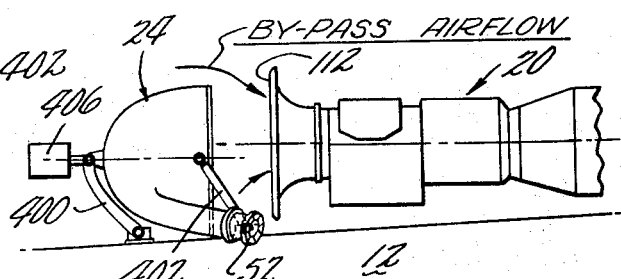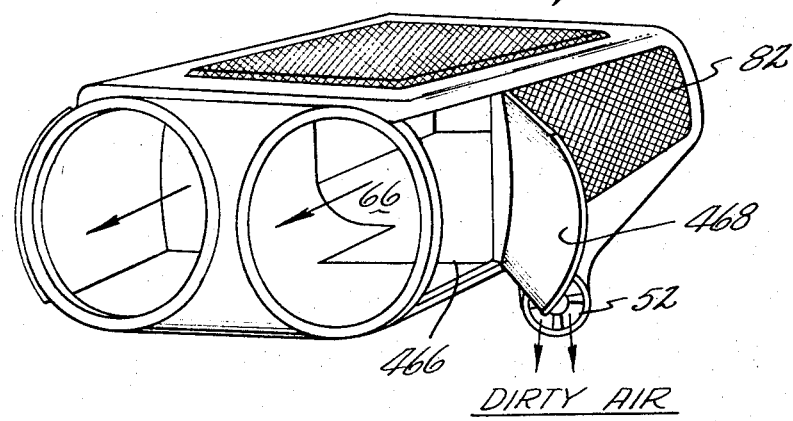

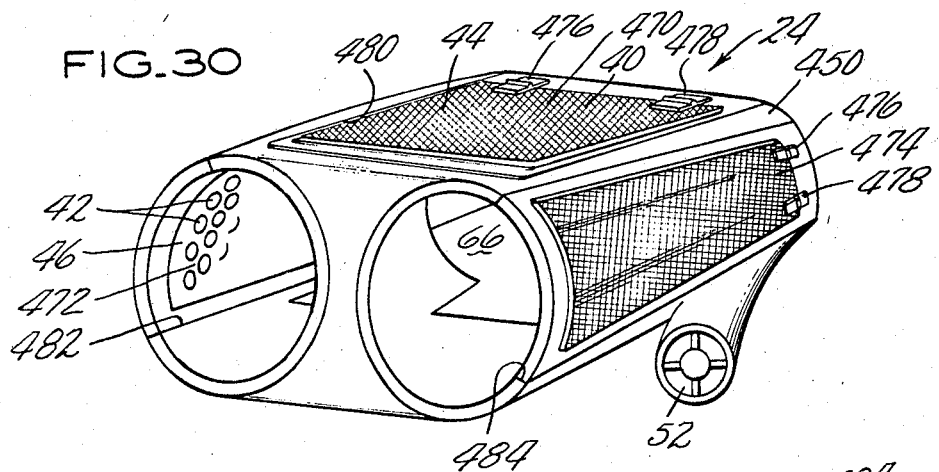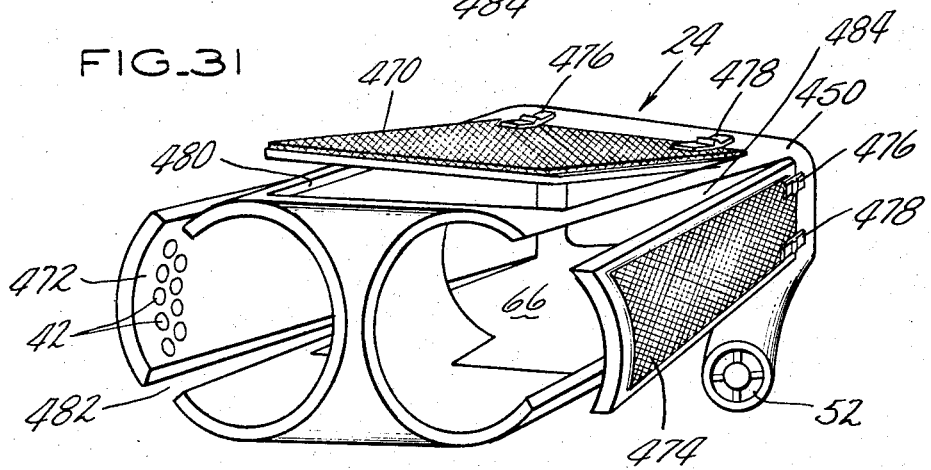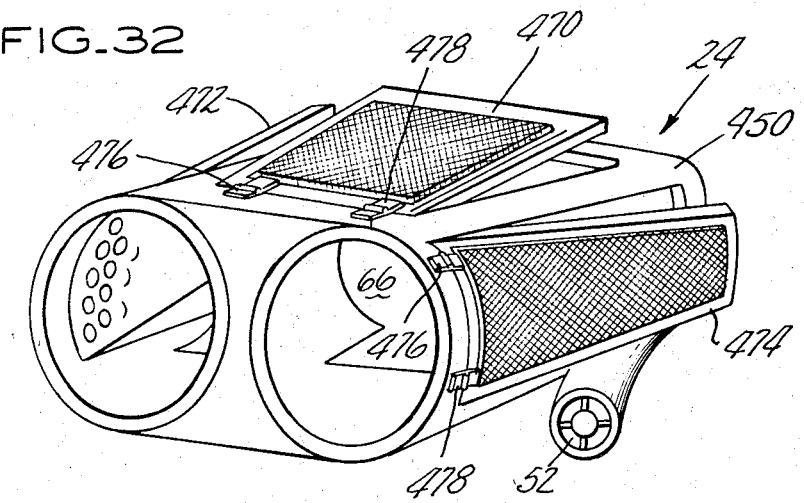

1

3,421,296
ENGINE INLET AIR PARTICLE SEPARATOR
Frederick C. Beurer, Sr., Hamden, Conn., assignor to United Aircraft Corporation, East Hartford, Conn., a corporation of Delaware
Filed Nov. 15, 1966, Ser. No. 594,428
U.S. Cl. 55—306                                            19 Claims
Int. Cl. B64c 21/00; B01d 45/12

ABSTRACT OF THE DISCLOSURE

In an engine air particle separator including a spaced walled member positioned forward of the engine inlet and shaped to define a passageway therethrough into the engine inlet and a chamber therebetween and having centrifugal separator tubes extending between the spaced walls, which tubes are shaped to receive particle ladened air through the outer of the spaced walls, to discharge cleaned air into the passageway and engine inlet, and to discharge separated debris into the chamber between the spaced walls for scavenge therefrom. The separator has minimum pressure loss bypass provisions.

---

This invention relates to filtration and more particularly to an engine inlet air particle separator to remove foreign particles from the air entering the inlet of an air-breathing engine and in particular an aircraft jet engine.

It is an object of this invention to teach an engine inlet air particle separator including an outer wall or duct communicating with atmosphere and an inner wall or duct enveloped within the outer wall to define a chamber therebetween and a passageway or compartment therewithin communicating with the engine inlet, and including a plurality of centrifugal separator tubes extending between and through the outer and inner wall members and shaped to present an inlet to atmosphere, a primary outlet to the passageway or compartment and a secondary outlet to the chamber through which separated particles are deposited into the chamber, and further including suction creating means to remove the separated particles from the chamber, and still further including bypass means to permit airflow into the passageway or compartment other than through the separator tubes.

It is an object of this invention to teach an engine inlet air particle separator in which, when desired, all air entering the engine must pass through one of a plurality of small, tube-type centrifugal separators which extend between spaced walls and which centrifugal separators are shaped to deposit separated particles into the chamber defined between the spaced walls.

It is still a further object of this invention to teach an engine inlet air particle separator in which the particles which are separated from the inlet air are removed by a scavenge system.

It is still a further object of this invention to teach an engine inlet air particle separator in which, when desired, the air entering the engine inlet may pass directly through bypass doors into the engine inlet, without going through the aforementioned tube-like separators.

It is still a further object of this invention to teach an engine inlet air particle separator with anti-icing provisions.

It is still a further object of this invention to teach an engine inlet air particle separator which is light in weight, which produces minimum pressure loss in the air passing therethrough and which presents a maximum number of small tube-like centrifugal separators through which the air entering the engine inlet may pass.

It is still a further object of this invention to teach such

2 a separator and to provide a coarse filter external of the separator tubes.

It is still a further object of this invention to teach such a separator wherein the centrifugal separator tubes are positioned at an angle with respect to the engine and separator axis so as to provide a ram effect to the atmospheric air entering the filter tubes as the aircraft moves forward, and further wherein a plurality of cowl flaps are provided to be movable to either an open position wherein adjacent cowl flaps coact to define air inlet passages to the separator tubes or a closed position wherein the cowl flaps present a smooth exterior surface for the separator while blocking airflow into the separator tubes.

It is still a further object of this invention to teach such a separator which is adapted to coact with an air-breathing engine having an annular air inlet and which includes outer and inner spaced walls with centrifugal separator tubes extending therebetween and a third wall spaced inwardly of the inner wall and cooperating therewith to form an annular inlet passage to the annular inlet of the engine and including a translatable door member which may be actuated to a first position wherein it blocks airflow to the engine inlet passage and a second position wherein it permits airflow through the engine inlet passage, and further including a fourth wall member positioned within the third wall member and extending along the engine axis and having an inlet and an outlet positioned to permit ram air to be directed therethrough into the engine area for cooling purposes.

Other objects and advantages will be apparent from the specification and claims and from the accompanying drawings which illustrate an embodiment of the invention.

FIG. 1 is a showing of a modern aircraft such as a helicopter showing two of the engine inlet air particle separators in position.

FIG. 2 is a perspective showing, partially broken away, of an engine inlet air particle separator to show the construction thereof.

FIG. 3 is similar to FIG. 2 but shows a different type of bypass door and a different type of scavenge system.

FIG. 4 is a side view of the engine inlet air particle separator connected to an engine inlet and supported from the aircraft fuselage.

FIG. 5 is a showing of a fluid-inflatable seal positioned to seal the gap between the separator and an engine inlet.

FIG. 6 is a cross-sectional view through a portion of the engine inlet air particle separator to show the spaced outer and inner walls, the coarse filter exterior thereof, the chamber therebetween and one of the tube-like centrifugal separators in greater particularity.

FIG. 7 is a cross-sectional view of the engine inlet air particle separator shown in FIG. 4 to show the double-wall construction in greater particularity.

FIG. 8 is a cross-sectional showing of the type of bypass door illustrated for use with the engine air inlet particle separator in FIGS. 1 and 2.

FIG. 9 is a cross-sectional showing of a modification of the engine inlet air particle separator.

FIG. 10 is a front view of the engine inlet air particle separator shown in FIG. 9.

FIG. 11 is a showing of another version of the engine inlet air particle separator with provisions for anti-icing by means of heat application to the inlet air.

FIG. 12 is a front view of the engine inlet air particle separator shown in FIG. 11.

FIGS. 13 and 14 are side views of a modification of the engine inlet air particle separator which is movable with respect to the engine inlet so as to be immediately adjacent thereto as shown in FIG. 13 or spaced substantially therefrom as shown in FIG. 14.

FIG. 15 is a perspective showing of another form of bypass doors which may be used with the engine inlet air particle separator and which are of the venetian blind type.

FIG. 16 is a perspective showing of a modification of the engine inlet air particle separator which is of D-shaped cross section.

FIG. 17 is a cross-sectional showing of a portion of the separator shown in FIG. 16 to illustrate the connections between the spaced inner and outer walls, the chamber defined therebetween, the passageway or compartment defined therewithin, and the centrifugal separator tubes extending therebetween.

FIG. 18 is a cross-sectional showing of a centrifugal separator tube using a coarse filter insert in the air inlet thereof.

FIG. 19 is a cross-sectional showing of a pressure indicator used in the scavenge duct system of the separator to indicate when the scavenge blowers are operating.

FIG. 22 is a side view of a dome-shaped modification of the engine inlet air particle separator shown supported from the fuselage in a position spaced forward of an air-breathing engine.

FIG. 23 is an enlarged cross-sectional showing of the dome-shaped separator shown in FIG. 22 but with the separator sealably engaging the engine inlet.

FIG. 24 is a front view of the separator shown in FIGS. 22 and 23.

FIG. 25 is an enlarged cross-sectional showing of the connection between the inner and outer walls of the dome-shaped separator of FIGS. 22–24.

FIG. 26 is a top view of another modification of the engine inlet air particle separator having filter panels forming the four peripheral walls thereof and two additional filter panels pivotally mounted within the peripheral wall panels.

FIGS. 27, 28 and 29 illustrate modifications of the engine inlet air particle separator including a plurality of filter panels joined to form a filter cage with a bypass aperture therein and including various bypass door arrangements to either block or permit flow through the bypass aperture, FIG. 27 shows a translatable door, FIG. 28 shows double, two-piece pivotal doors, and FIG. 29 shows a one-piece pivotal door.

FIGS. 30, 31 and 32 show versions of the engine inlet air particle separator in which one or more filter panels are pivotally supported to be movable between a first position wherein the filter panel defines part of the filter cage and a second position wherein the filter panel is spaced from a filter cage bypass aperture to permit airflow into the filter cage through the bypass aperture, FIG. 30 shows all filter panels in their closed positions to demonstrate filtration mode of operation of the filter cage, FIG. 31 shows the filter cage in the bypass mode of operation with the movable filter panels pivotally connected at their forward ends to the forward end of the cage, and FIG. 32 shows the filter cage in the bypass mode of operation and with the movable filter panels pivotally connected at their after ends to the after end of the filter cage.

Figure 33:
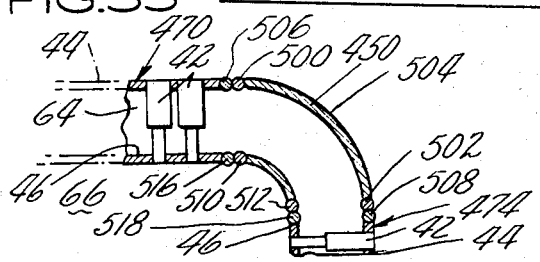

FIG. 33 is an enlarged cross-sectional showing illustrating one of the corners of the filter cage in the FIG. 30–32 construction to illustrate the sealable connection between the cage frame and the movable panels.

Figure 34:
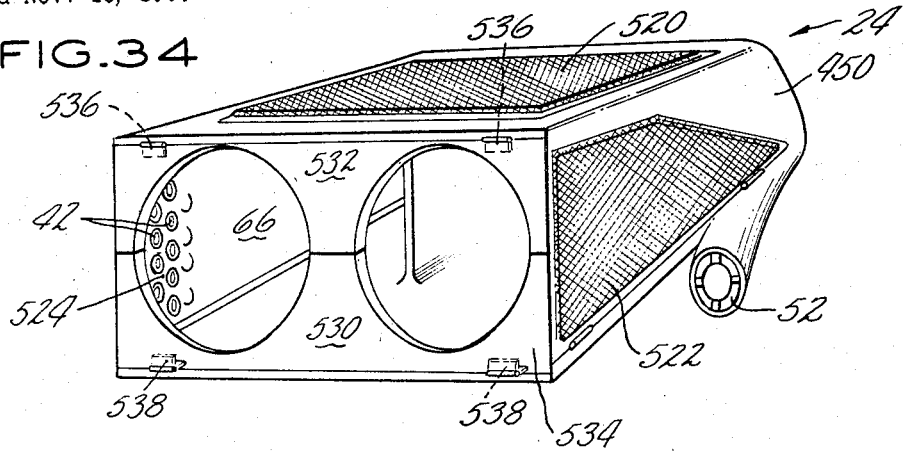
Figure 35:
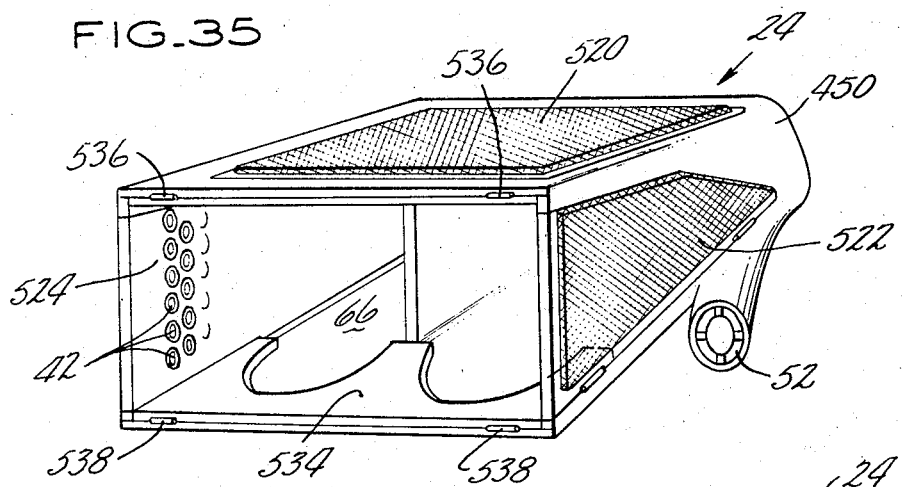
Figure 36:
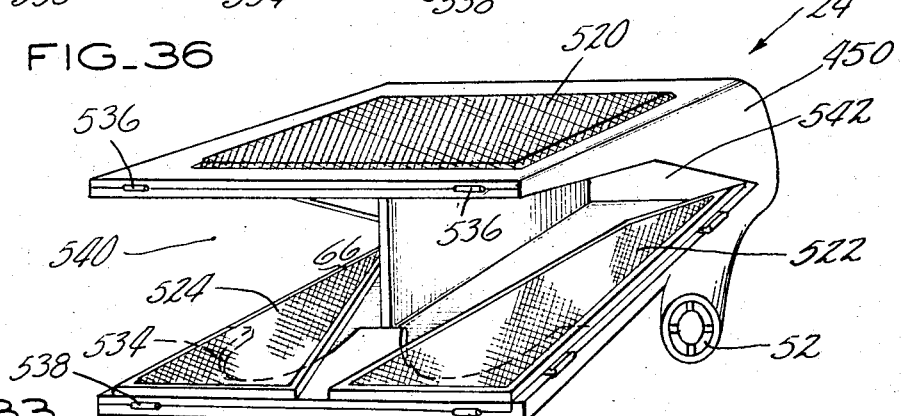

FIGS. 34, 35 and 36 show an embodiment of the engine inlet air particle separator in which the rear wall of the filter cage is pivotable between a filtration and a bypass position and wherein both side walls of the filter cage include filter panels which are pivotably mounted to be movable between a filtration and bypass position, wherein FIG. 34 illustrates the filter cage in the filter mode of operation, FIG. 35 illustrates the filter cage with the rear wall in bypass mode of operation, and wherein FIG. 36 illustrates the filter cage with both the rear wall and the side wall filter panels in bypass mode of operation.

Referring to FIG. 1 we see modern aircraft 10 which is illustrated to be of the helicopter type and which includes fuselage 12, main rotor assembly 14, at least three landing gear such as 16, and pilot compartment 18. Aircraft 10 is powered by engines 20 and 22, which are attached by appropriate transmission mechanism, such as the type best shown in U.S. Patent No. 2,979,968 to drive both the main rotor assembly 14 and the tail rotor assembly (not shown). Engines 20 and 22 are preferably of the turbine type which consist of a compressor section, a combustion chamber section, and a turbine section in axial alignment which is best shown in U.S. Patents Nos. 2,711,631 and 2,747,367 and which may also consist of a free turbine downstream thereof. Two engine inlet air particle separators 24 and 26 are shown in FIG. 1, but it should be borne in mind that one such separator could have been used. For purposes of illustration, separator assembly 24 only will be described, but separator assembly 26 is identical therewith except possibly to be made allochiral therewith in installations requiring such an arrangement. Separator assembly 24 is attached to the aircraft fuselage 12 by any appropriate mounting means such as mounts 28 and 30 and there are preferably similar mounts at the after end of separator 24 so that the separator is attached firmly to the fuselage 12 at at least four points. Engine mounts 28 and 30 are selected to support separator assemblies 24 and 26 a distance from, or in spaced relation to fuselage 12 to minimize ingestion of foreign particles which might accumulate there or be entrapped in the fuselage boundary layer.

As best shown in FIG. 2, the engine inlet air separator assembly, duct or filter cage 24 comprises a plurality of panel members such as top panel 32, side panel 34 and a similar side panel (not shown) on the opposite side from side panel 34. A bottom panel could also be used if desired. The panel members are joined to define a double-walled duct with a passageway or compartment 66 therewithin. A fifth panel could be used at the front of the separator assembly, if desired, but it is considered preferable to place a bypass door unit 36 in aperture 38 at the front end of the separator assembly 24. Bypass door unit 36 is positioned in aperture 38 of fairing member 39 (see FIG. 3) to completely block off aperture 38 when the doors are closed so that all air entering the engine 20 must pass through one of the many filter panels such as 32 or 34, or if air filtration is not needed or if airflow blockage is encountered in the separator panels, the bypass doors 36 may be opened so that the air may enter the engine through aperture 38 in a direct-ram fashion since aperture 38 is preferably spaced axially forward of and in axial alignment with the engine inlet. The panel members such as 32 and 34 are of similar basic construction and comprise an outer coarse filter screen member 40 or other large particle filtration means and each panel includes a plurality of small tube-like centrifugal separators 42 which extend between and are positioned by an outer wall 44 and an inner wall 46. The filter panels (such as 32 and 34) are connected such that the walls 44 and 46 constitute a double-wall construction so as to define a scavenge duct system 50 connected to and communicating with scavenge blowers 52 and 54. A similar set of scavenge blowers may be located on the opposite side of the separator assembly 24 if desired but are not included in this design. Ducting or manifold 56 connects the scavenge duct system 50 to the scavenge blowers 52 and 54.

Still referring to FIG. 2, it will be noted that a single engine inlet air particle separator 24 is positioned in front of a single engine 20, whereas, FIG. 3 illustrates an embodiment in which a single engine inlet air particle separator 24 is positioned in front of and services two engines 20 and 22. FIG. 3 is otherwise similar to FIG. 2 except that the bypass door 60 is of a different type. Bypass door 60 is hinged about pivot arm 62, which is pivotally supported in fairing 39 and which may be actuated in any convenient way from the pilot compartment 18, such as by rack 61 which is reciprocated by pilot-operated motor 63 and which engages and turns gear 65, attached to shaft 62 so as to swing bypass door open either inwardly or outwardly to any desired inlet position. In addition, the FIG. 3 embodiment uses a single scavenge blower 52 in duct 56.

Viewing FIG. 4 we see a side view of the engine air inlet particle separator 24 which illustrates panel member 34 and scavenge duct system 50. The rearward or after end of separator assembly 24 is attached to or includes cylindrical member 114. Seal member 118 is mounted on engine inlet ducting 112 with its arcuate inner surface 120 in sealing engagement with member 114 which is coated with a low friction material such as nylon or Teflon. In this fashion, either axial or circumferential relative motion, is permitted between the separator assembly 24 and the engine 20. This is deemed necessary because many engines are mounted so that some circumferential motion thereof is present. In the design the seal is also thus constructed so that no influence will be exerted on the torque indicating system described in U.S. Patent No. 3,135,487 and utilized on the aircraft 10.

While a particular type of seal arrangement is shown in FIG. 4, an alternate type of seal arrangement is shown in FIG. 5. In the FIG. 5 arrangement the separator assembly 24 is again placed in front of engine 20 so that engine inlet 112 envelops cylindrical surface 114 of outlet 110 of separator 24 and wherein circuitous passage 111 is defined between separator assembly 24 and engine inlet 112. An inflatable seal ring 113 is supported from engine inlet 112 and may be inflated by pressurized fluid from pressurized source 115, which is connected by ducting 117 to ring seal 113. Valve means 119, which is pilot operated through solenoid 121, is located in ducting 117 and is preferably of the three position variety to either admit pressurized fluid into inflatable seal ring 113 to cause it to assume its FIG. 5 phantom position and thereby block airflow through circuitous passage 111 or to bleed pressure from inflatable seal ring 113 so that the seal ring 113 will collapse as shown in solid lines in FIG. 5 to permit airflow through circuitous path 111. The advantage of the FIG. 5 construction is that passage 111 forms a bypass passage into engine 20 around separator assembly 24 so that the atmospheric air may enter the engine without passing through the separator and, most importantly, because of the circuitous route defined by passage 111, the atmospheric air in passing therethrough will encounter several changes in direction so that large particles, such as ice particles, will be removed from the air entering the engine.

As best shown in FIG. 4, banks of separator tubes 42, such as banks 300, 302 and 304, are separated to define passages 306 and 308 therebetween to permit better scavenge of the separated particles. Due to this spacing, the separated particles have to travel but a short distance in between the tubes to get to the clear passages 306 and 308.

Still viewing FIG. 4, it will be seen that pressure probe unit 262 is supported from separator assembly 24 and projects into passageway 66. Appropriate instrumentation, such as line 263 and pressure gauge 265 transmits pressure readings from pressure probe unit 262 to the pilot in pilot chamber 18, preferably in the form of a warning light. The purpose of pressure probe 262 is to warn the pilot that airflow to the engine through passageway 66 has reduced in pressure, possibly due to blockage in the filter panels such as 32 and 34, so that the pilot may open the bypass doors such as 36 and 60. FIG. 4 also illustrates the fashion in which separator assembly 24 is supported in spaced relation to fuselage 12 by supports 30.

Separator tubes 42 and the makeup of all the filter panels shown herein are shown in greater particularity in FIG. 6. It will be noted that separator tubes 42 are positioned inward of coarse filter screen member 40 and extend between outer wall 44 and inner wall 46 of a panel member such as 34. Walls 44 and 46 are spaced so as to form chamber 64 therebetween. Chamber 64 is joined to scavenge duct system 50 as described hereinafter. While filter members 42 may be any type of particle separators, centrifugal separators are preferred and the type illustrated is of the tube-type variety consisting of an outer member 68 and an inner member 70 joined or spaced by web members 75. Outer member 68 includes a plurality of swirl vanes 72 in one or more banks. By viewing FIG. 6 it will be noted that the air which enters separator assembly 24 is first passed through screen member 40, which screen member will prevent any large particles from flowing therethrough. After passing through screen member 40, the air must then pass through one of the centrifugal separator tubes 42 since there is no other flow path joining the atmosphere exterior of the separator assembly 24 and engine inlet passageway 66 when bypass doors 36 or 60 are closed. In passing through centrifugal separator 42, the air enters tube inlet 69 and the presence of fixed swirl vanes 72 will cause the foreign particles, which are heavier than air, to separate out of the air by being centrifugally spun outwardly against the wall of outer member 68, while the clean air passes through the central portion of the separator tube assembly 42. The clean air will accordingly enter inner member 70 to be discharged therefrom into passageway 66 through primary tube exit 71 while the foreign particles which have been separated by the action of the swirl vanes 72 will enter chamber 64 through secondary annular outlet passage 74.

As best shown in FIG. 7, separator assembly 24 is preferably formed by attaching top panel member 32 and bottom panel member 80 to side panel members 82 and 34. Any or all panel members 32, 34, 80 and 82 may include the plurality of centrifugal separator tubes such as 42 but, it may be deemed desirable to leave bottom panel member 80 completely hollow for purposes of better scavenge of the separated particles. It will be noted that separator assembly 24 is constructed in cross section of two spaced walls such as 44 and 46 of panel 32, 84 and 86 of panel 34, 90 and 88 of panel 80, 92 and 94 of panel 82. The various panels are joined by a row of screws or nuts and bolts, for example, outer wall member 44 is joined to outer wall members 92 and 84 by nut and bolt rows 100 and 102, while inner wall member 46 is joined to inner wall members 94 and 86 by bolt and nut rows 104 and 106. Outer walls 44, 84, 90 and 92 are connected to form outer duct 45 while inner walls 46, 86, 88 and 94 are connected to form inner duct 95. Outer and inner ducts 45 and 95 define chamber 64 therebetween and inner duct 95 defines passageway or compartment 66 therewithin. Other desired spacing supports may also be used, but are not required in the design. Nut and bolt rows 120 and 130 connect scavenge duct member 56 to wall member 92 and to bottom wall member 90. In similar fashion nut and bolts rows 132 and 134 join inner walls 94 and 86 to inner wall 88. It will therefore be seen that any foreign particles separated from the air passing through centrifugal separators 42 will enter chamber 64 and be scavenged therefrom through scavenge manifold 56 by the action of scavenge blowers such as 52 and 54.

As is best shown in FIG. 9, a pressure indicator 267 is provided for the scavenge system and is preferably located on the bottom of scavenge manifold 56 to indicate whether suction exists in the scavenge duct system 50, which is indicative of whether scavenge blowers 52 and 54 are operating. Pressure indicator 267 may consist of a gaily colored flanged piston 269 which is retained on tube member 271 including fitting 273 which is threadably attached to manifold 56. Piston 269 will project through the end of tube 271 and be visible when there is no suction within manifold 56 or piston 269 will be sucked into the tube 271 when sufficient suction exists within manifold 56. In this fashion, it can be determined visually whether or not there is sufficient suction within the scavenge duct system 50 by noting the position of piston 269. Other known means such as a pressure gauge may be utilized and may communicate a signal to the cockpit if so desired.

The type of bypass door illustrated in FIGS. 1 and 2 is illustrated in greater particularity and in cross section in FIG. 8. It will be noted by referring to FIG. 8 that the door member 36 comprises a central swiveling panel member 131 having oppositely directed arms 133 and 135 pivotally connected to plate members 136 and 138. Swiveling member 131 is pivotally connected to pivot pin 140. With swivel member 131 positioned as shown in FIG. 8, plate members 136 and 138 engage groove-like members 150 and 152 in aperture 38 of fairing member 39. FIG. 8 depicts bypass door 36 in its closed position. When swivel member 131 is pivoted from its FIG. 8 position to a fore-and-aft position, plate members 136 and 138 will move and become free of groove members 150 and 152 so that plates 136 and 138 may be blown open to open a passageway through aperture 38 to permit ram air to enter compartment 66 and hence to move directly into the inlet of the engine 20. For sealing reasons, strip 145 may be connected by adhesive or any suitable means to plate members 136 and 138 to cover the member 131.

As best shown in FIG. 1, cable members 160 and 162 are connected to swivel member 131 and to handle 164 in the pilot's compartment 18 so as to permit the pilot to actuate the bypass doors 36.

As best shown in FIG. 15, the bypass door 250 located in inlet aperture 38 of separator assembly 24 may be of the venetian-blind type wherein each panel member such as 250a is pivotally connected to separator assembly 24 at aperture 38 by some mechanism such as pivot rod 252 and is shaped so that it slightly overlaps the adjacent panel member 250b when in its closed position. Each of the panel members of bypass door 250 is so fabricated. Bypass door 250 may be actuated to its open position by causing each panel member, such as 250a, to pivot about pivot rod 252 by the action of rack 254 and pinion 256, which is attached to pivot rod 252. Rack 254 may be caused to actuate in any convenient manner, for example by means of pilot actuated crank arm 260. In the alternative, rack 254 could coact with a single pinion such as pinion 256 of panel member 250a and the remaining panel members, such as 250b and 250c etc. could be caused to move in synchronization with panel member 250a by arm member 251 which is pivotally attached to each panel member.

Still another embodiment of the engine inlet air particle separator is shown in FIGS. 9 and 10. This particular embodiment is preferably of circular cross section and the same reference numerals will be used in describing it as were used in describing the earlier constructions. By viewing FIGS. 9 and 10 it will be seen that the separator assembly 24 comprises outer wall 44 and inner wall 46, both of which are preferably of circular cross section and concentric about axis 170. A plurality of centrifugal air separator tubes 42 extend between wall members 44 and 46 such that air passes therethrough in entering engine inlet passageway or compartment 66. As in the earlier described embodiment, outer wall 44 and inner wall 46 cooperate to form chamber 64 which receives the separated particles passing through centrifugal tube separators 42. Compartment 64 is subjected to a scavenging action by scavenge blower 52 in scavenge duct system 50. Either a screen member 40 or a screen member covered by a plurality of cowl flap members 172 may envelop the centrifugal separator tubes 42. Cowl members 172 may be pivotally connected to support rings 171 of harness 173 and caused to pivot to an open position about their pivot points 174 by the motion of rod member 176, which is pivotally attached to the outer end of each cowl flap 172 and which is actuated forwardly or rearwardly by any appropriate mechanism such as a manually operated lever or any mechanized means such as pilot operated motor 175. It will be seen in the FIG. 9 and 10 constructions that the centrifugal separator tubes 42 are canted about 30° with respect to axis 170 to permit a ram effect with respect to the air passing thereinto as the aircraft moves in a forward direction. A bypass door 180 is mounted across the inlet 38 of separator assembly 24 and may be pivoted about pivot axis 182 to its solid line position to block flow through aperture 38 into compartment 66 and thereby cause all air entering engine 20 to pass through centrifugal separator tubes 42. Bypass door 180 may also be actuated by an convenient mechanism, such as the pilot operated rack and pinion shown in FIG. 3, to its fully open phantom line position shown in FIG. 9. With bypass door 180 open, ram air may pass through aperture 38 and compartment 66 directly into the inlet of engine 20, since the engine and separator assembly are aligned and are preferably coaxial. In operation, the separator assembly shown in FIGS. 9 and 10 operates the same way as the separator assembly 24 shown in the earlier figures already described in that the air enters centrifugal separators 42 and the clean air passes through the center thereof into compartment 66 and thence into the engine 20 and, the foreign particles separated by centrifugal separators 42 pass into chamber 64 and are drawn therefrom in suction or scavenge fashion by blower 52.

If hot air deicing to the engine inlet air particle separator is desired, the construction shown in FIGS. 11 and 12 could be used. This construction is the same as the FIG. 9 and 10 constructions with respect to the separator assembly 24 except that heated air will be passed through chamber 64 and over the centrifugal tubes 42. The air to be heated enters duct 190 through inlet 192 due to the action of suction blower 52 and possibly an auxiliary blower 55 and is heated by anti-icing heater mechanism 200 and then passes through duct 201 and chamber 64 to heat the centrifugal separator tubes 42 to prevent icing thereof. Heater 200 may be eliminated if duct 190 is attached to the compressor section of engine 20 so that the engine compressor pumps heated and pressurized air into duct 190 and then through chamber 64 of the FIG. 11–12 embodiments for anti-icing purposes. The FIG 11–12 constructions also differ from the FIG. 9–10 constructions in that a different type of bypass door mechanism is used. The bypass door mechanism 203 of the FIG. 11–12 constructions include two or more rotatable door sections such as 205 and 207 which are mounted to be rotated in opposite directions by shaft and gear mechanism 199 which is driven by pilot operated electric motor 211. This bypass door system 203 is particularly advantageous in the FIG. 11–12 constructions wherein the inlet aperture 38 to compartment 66 is substantially kidney-shaped as best shown in FIG. 12. Doors 205 and 207 may be rotated in opposite directions to the overlapping position illustrated in FIGS. 11 and 12 and these doors may also be rotated in opposite directions to completely cover kidney-shaped aperture 38 of the FIG. 11–12 constructions. The outer periphery of rotatable doors 205 and 207 are received in and guided by peripheral track member 209.

While the blower units 52 and 54 of the scavenge system may be operated in any conventional manner, such as by electrical motors, it is proposed herein, as best shown in FIG. 1 to bleed compressed air from one of the jet engines, such as 20 through lines 270, whenever pilot operated solenoid valve 272 is open, and then through lines 274 and 276 to impinge upon the blades 49 (FIG. 3) of the turbine portions 51 of blower units 52 and 54.

While scavenge blowers are preferably used as described with the separator assembly, it is also possible to operate the separator assembly by any other air moving means such as an ejector. It is also possible to use the separator assembly 24 without scavenge blowers, or air moving means, but at a lower efficiency.

Referring to FIGS. 13 and 14, we see an embodiment of the engine inlet air particle separator which is mounted on fuselage 12 so as to be movable with respect to the inlet of engine 20 between the FIG. 13 position wherein the separator asembly 24 is positioned to be in sealing engagement with engine 20 by the action of a seal ring 200 and the FIG. 14 position wherein a substantial gap 202 exists between the inlet of engine 20 and separator assembly 24. Separator assembly 24 is caused to move as just described by pilot operated hydraulic cylinder-piston mechanism 204, which is pivotably attached to fuselage 12 at pivot point 206 and to collector assembly 24 at pivot point 208. Link members 210 and 212 are each pivotably connected to the fuselage at pivot points 214 and 216, respectively and to collector assembly 24 at points 218 and 220, respectively. A bypass door arrangement of any type, but which is illustrated to be similar to member 60 of the FIG. 3 construction, is pivotably mounted in the inlet aperture 38 of the collector assembly 24. In all other respects collector assembly 24 is fabricated in the same fashion as the collector assembly embodiments illustrated in FIGS. 2 and 3 described in full particularity above.

In operation, the FIG. 13, 14 engine inlet particle separator operates so that when the particle separator 24 is in its FIG. 13 position with respect to engine 20 and bypass door 60 blocks off separator inlet aperture 38, all air entering engine 20 must pass through the centrifugal separator tubes 42 of the filter panels such as 34 and this can be described as the complete filtration mode of operation. When the collector assembly 24 is in its FIG. 13 closed position with respect to engine 20 and bypass door 60 is open as shown in FIG. 13, atmospheric air may enter engine 20 in ram fashion directly through inlet aperture 38 and compartment 66 of separator assembly 24. This mode of operation could be described as the filtration bypass mode without deicing. When collector assembly 24 is in its FIG. 14 open position with respect to engine 20, and bypass door 60 is in its FIG. 14 closed position, atmospheric air may enter engine 20 through gap 202 formed between engine 20 and collector assembly 24. During flight operation, since the dimensions of the after end of separator assembly 24 are larger than the dimensions of the inlet of engine 20, it will be necessary for atmospheric air to follow a circuitous route wherein the air first passes around filter assembly 24, then downwardly and into gap 202 and then rearwardly into the inlet of engine 20. This circuitous route causes the atmospheric air entering inlet 20 to make substantially right angle turns so that all large objects, including ice particles, will be filtered from the air due to their failure to make these turns with the air. This may be described as the unfiltered mode of operation with anti-icing.

FIGS. 16 and 17 depict another modification of the engine inlet air particle separator which is of D-shaped cross section and adapted to be used with a D-shaped engine inlet. The FIG. 16–17 constructions are similar to the earlier described constructions in that all air entering the engine may be caused to pass through centrifugal separator tubes such as 42 which extend between the double walls 44 and 46 of filter panels such as 32 and 34, each of which panels is connected as previously described to scavange duct system 50. The filter panels 32 and 34 coact with scavenge duct system 50 to define inlet compartment 66 to the engine 20. Filter panels 32 and 34 are fabricated in the fashion shown in FIG. 6 to include outer wall 44 and inner wall 46 which define chamber 64 therebetween. Suction blower mechanism 52 is connected to chamber 64 by scavenge ducting 50 and operates to remove separated particles from chamber 64. A bypass door is placed in aperture 38 of inlet fairing 39 at the forward end of the filter or separator assembly 24 and is actuatable to either block aperture 38 to cause all air entering the engine to pass through centrifugal separator tubes 42 or to permit ram air to enter the engine directly through aperture 38 and compartment 66. The bypass doors comprise two pivotable members, namely, member 60a, which is pivotable about pivot axis 350 and member 60b which is pivotable about pivot axis 352. Bypass doors 60a and 60b are shaped to occupy one half of the D-shaped inlet aperture 38 of FIG. 15 so that when both doors are in their illustrated closed position, they cooperate to form a D-shaped door in D-shaped inlet aperture 38. Panels 32 and 34 and scavenge duct system 50 are shaped so that separator assembly 24 is of D-shaped cross section. The filter panels such as 32 and 34 may be either flat or may be formed to have curved inner and outer walls 44 and 46. The FIGS. 16–17 separator assembly 24 is supported in spaced relation from fuselage 12 by any convenient connecting means 30.

It will be noted by viewing the FIG. 16–17 constructions that the cross-sectional area of filter assembly 24 increases in a downstream direction between inlet aperture 38 and some preselected station such as station 63 in FIG. 16, and then decreases in cross-sectional area in a downstream direction between station 63 and the outlet of filter assembly 24. The same increase and then decrease in cross-sectional area is prevalent in the FIG. 2–4 constructions since, as best shown in FIG. 4, the maximum cross-sectional area across filter assembly 24 occurs at station 63 so that the cross-sectional area of filter assembly 24 increases between the inlet thereof and station 63 and decreases between station 63 and the outlet thereof. This cross-sectional area variation is desirable in that it serves to slow down the air passing through the filter assembly 24 and thereby minimize pressure drop through the compressor section of the turbojet engine into which the air is being passed.

While the large particle filter has been depicted as a large area screen member 40 covering the outer wall 44 of the double-walled filter panel, such as 32, a saving in weight may be realized by fabricating the large particle filter element as a molded screen insert 40a as shown in FIG. 18. Each centrifugal separator tube 42 would have such a molded screen insert 40a of circular cross section inserted therein upstream of swirl vanes 72 and may be fabricated to be sealable thereagainst at ring shoulder 360.

Figure 20:
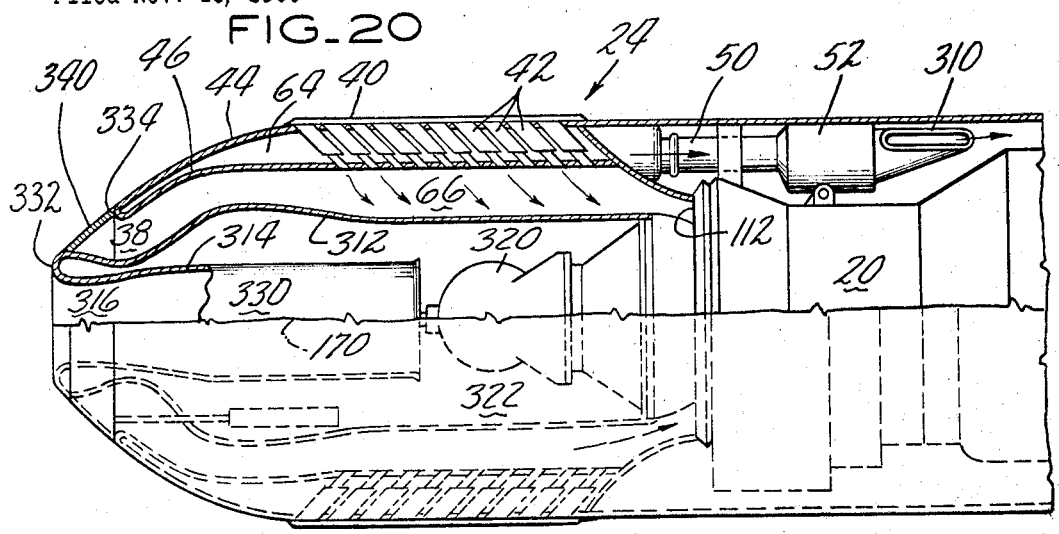
FIG. 20 is a cross-sectional side view of a modification of the separator adapted for use with an air-breathing engine having an annular inlet.
Figure 21:
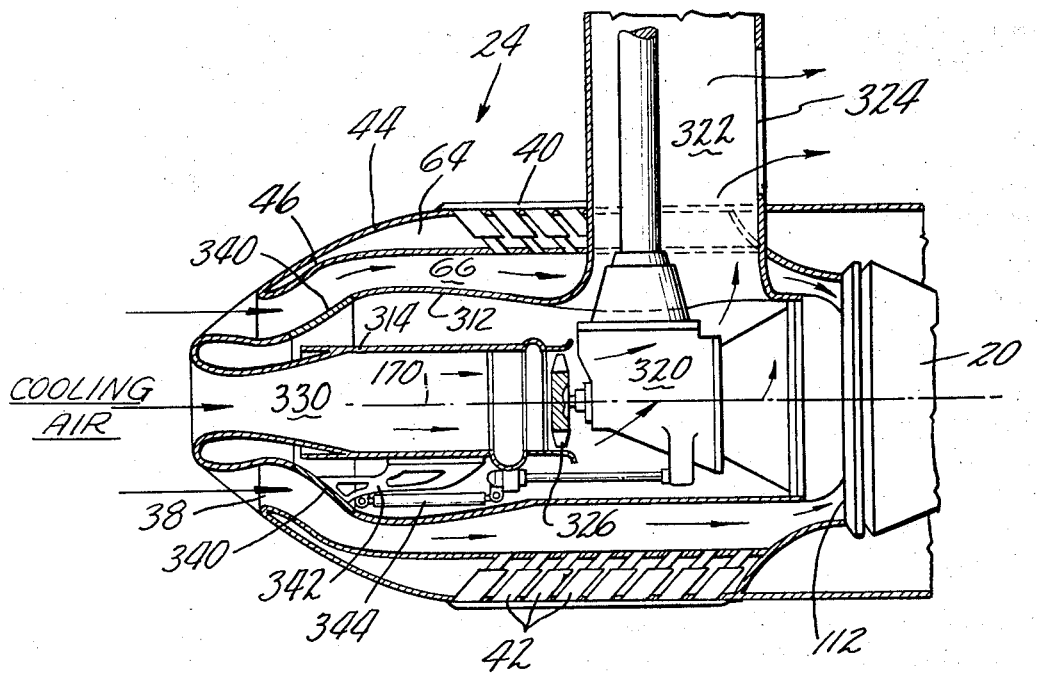
FIG. 21 is a cross-sectional top view of the modification of the separator shown in FIG. 20.

Another embodiment of the engine air inlet particle separator is shown in FIGS. 20 and 21. This construction is particularly adapted for use with an air-breathing engine 20 having an annular inlet 112. Separator assembly 24 is positioned forward of engine inlet 112 and includes outer wall 44 and inner wall 46 spaced to define scavenge chamber 64 therebetween and having a plurality of centrifugal separator tube members 42 extending therethrough so that, as previously described in connection with FIG. 6, atmospheric air may have foreign particles separated therefrom bypassing through coarse screen separator 40 and then through separator tubes 42 to deposit the separated foreign material into chamber 64 before passing into annular inlet compartment 66. As in the other embodiment of the separator, the separated material is removed from scavenge chamber 64 through scavenge duct system 50 by the action of suction unit 52, and exhaust at exhaust outlet 310. A third wall member 312 is positioned in spaced relation inward of wall member 46 and cooperates therewith to define annular inlet compartment 66 therebetween. A fourth wall member 314 is positioned inward of wall member 312 and has an inlet opening 316 at the forward end thereof which is open to atmosphere to receive ram air during aircraft forward motion, which ram air passes over engine or aircraft accessories 320 in cooling chamber 322 and is then released to atmosphere through cooling air outlet 324. Blower member 326 is positioned in cooling air passageway 330 defined within wall member 314 and may be driven by the accessory drive unit 320 to draw cooling air into the accessory chamber 322 when the aircraft is not in motion. Wall members 44, 46, 312 and 314 are preferably of circular cross section and concentric about axis 170 so that chamber 64 and compartment 66 are annular in cross section. It will be noted that the forward end 332 of wall member 312 is positioned substantially forward of the forward end 334 of wall member 46 so that the annular inlet aperture 38 to inlet compartment 66 is canted with respect to axis 170. Tapered annular bypass door or ring 340 is mounted on bracket members 342 to be caused, by the action of fluid power cylinders 344, to reciprocate between its FIG. 20 closed position wherein it blocks airflow into inlet compartment 66 through inlet aperture 38 and its open FIG. 21 position wherein air may enter into compartment 66 and hence engine 20 through inlet aperture 38. Accordingly, when bypass door 340 is closed as in FIG. 20, separator assembly 24 is operating in its complete filtration mode wherein all air which enters engine 20 must pass through the centrifugal separator tubes 42. When bypass door 340 is in its FIG. 21 open position, ram air may enter inlet aperture 38 to pass through inlet compartment 66 into engine 20 in a bypass mode of operation.

FIGS. 22, 23 and 24 show another modification of the engine inlet air particle separator in which the separator is formed to be generally dome-shaped and to be axially movable forward of the engine to generate a bypass space therebetween for bypass mode of operation or to sealably engage the engine inlet during the filtration mode of operation.

FIG. 22 shows separator assembly 24 supportably positioned from fuselage 12 by pivot linkage 400, 402 and 404 (FIG. 24) each of which is pivotally connected to the fuselage and to the separator assembly. Any convenient mechanism such as pilot operated motor 406 can be used to coact with pivot links 400, 402 and 404 to move the separator assembly 24 to a bypass position as shown in FIG. 22 wherein atmospheric air can pass around the separator assembly and into the engine inlet 112. The air bypassing the separator 24 and entering the engine 20 directly must follow a circuitous route and hence the larger particles, such as ice will be separated therefrom before the air enters the engine inlet 112. The same mechanism can cause separator assembly 24 to move to the FIG. 23 position where it sealably engages engine inlet 112 by the action of circumferential seal ring 408. With separator assembly 24 in the FIG. 23 filtration position, all air entering engine inlet 112 must pass through the separator tubes 42. The FIGS. 22–24 separator assembly is made of a plurality of sealably joined, pie-shaped segments such as 410 and 412, each of which is arcuate in form and the plurality of segments are circumferentially positioned and joined so as to form the dome shape. Each segment, such as 412 (FIG. 23) includes an outer wall 44 and an inner wall 46 spaced therefrom to form scavenge chamber 64 therebetween. Each pie-shaped segment such as 412 includes a plurality of centrifugal separator tubes 42 arranged in banks as illustrated in FIG. 23 and with a coarse filtration medium, such as wire mesh 40, covering the tubes. The particles which are separated from the engine inlet air and deposited in chamber 64 are removed therefrom in scavenge fashion by suction blower 52. The outer and inner walls of adjacent pie-shaped segments such as 410 and 412 may be joined in any convenient fashion such as the overlapping, bolted or riveted construction shown in FIG. 25.

Another modification of the engine inlet air particle separator is shown in FIG. 26. This modification is of rectangular cross section including a top panel member 420, a bottom panel member (not shown) and two side panel members 422 and 424. Each of these panels is fabricated in the fashion described in connection with FIGS. 6 and 7 so that the particles which are separated from the engine air passing through filter tubes 42 may be scavenged from the chamber 64 between the outer and inner walls 44 and 46 through scavenge duct system 50, due to the action of scavenge pump 52. The panels are joined and cooperate to define inlet compartment 66 therewithin having an inlet opening 38 and an outlet opening 110 at the opposite sides thereof. Outlet opening 110 sealably engages the inlet of engine 20.

The FIG. 26 modification is unique in that it includes two additional filter panels 430 and 432 which function as bypass doors, each of which is pivotally mounted in inlet compartment 66 at pivot points 434 and 436 so as to be movable between a first position wherein panels 430 and 432 are juxtapositioned and extend along the axis 170 of the separator assembly 24 and a second position wherein the panels 430 and 432 form a V-shaped dam across inlet compartment 66. Filter panels 430 and 432 are fabricated as described in connection with FIG. 6. The separator assembly 24 shown in FIG. 26 can be operated in a bypass mode of operation when the separator panels 430 and 432 are in their juxapositioned, non-blocking position.

This separator assembly modification can be operated in a filtration mode of operation when the filter panels 430 and 432 are in their V-shaped blocking positions.

Ice deflector 37 is positioned in front of separator assembly 24 and is mounted on actuating rods such as 426 and 428, which are caused to actuate by any convenient means such as an electric motor so as to cause deflector 37 to move from a raised position requiring inlet air and ice particles to pass therearound in a circuitous path to a lowered position where it will not obstruct the passage of air.

The separator assembly 24 can therefore be operated in a bypass mode with deicing since the aforementioned circuitous path is followed by the air passing around deflector 37 and entering inlet compartment 66.

Another modification of the engine inlet air particle separator is shown in FIGS. 27–29. In this modification, the separator is generally of the construction described in connection with the separators illustrated in substantial particularity in FIGS. 2, 3, 4, 6 and 7 and the unique feature thereof is the bypass door arrangement. In the modification shown in FIG. 27, an aperture 440 is fabricated into side panel 82 and axially translatable door 442 is received in runners 444 and 446 in side panel 82. When door 442 is in the position shown in FIG. 27, aperture 440 is open and bypass flow from atmosphere may enter inlet compartment 66 through aperture 440, without passing through any of the centrifugal separator tubes 42 in the various panels. When complete filtration of air entering inlet compartment 66 is desired, bypass door 442 is translated so as to close aperture 440, thereby causing all air which enters inlet compartment 66 to pass through one of the centrifugal air separator tubes 42 in one of the filter panels. An advantage of this construction is that a filter panel 450, of the construction described in connection with FIG. 6 may be placed at the forward end of the filter assembly 24, to receive ram air during aircraft flight operation.

The construction shown in FIG. 28 is generally similar to the construction shown in FIG. 27 except that the bypass doors are of a different variety. In this construction an aperture 452 is fabricated in one of the side panels such as 82 and one or more sets of bypass doors 454 may be mounted therein. Each of the bypass doors 454 includes a top portion 456 and a bottom portion 458, which are pivotally connected to side members 82 by any convenient means such as hinge members 460 and 462 and are of selected size and shape so as to fill aperture 452 when in their closed position. In the FIG. 28 construction, all air entering inlet compartment 66 must pass through a centrifugal separator tube 42 when the bypass doors are closed and may enter inlet compartment 66 through inlet aperture 452 when the bypass doors are open, thereby eliminating filtration.

The engine inlet air particle separator shown in FIG. 29 is similar to the separator assemblies shown in FIGS. 27 and 28, but differs therefrom in the bypass door construction. Again, a side panel 82 is fabricated to have an inlet aperture 466 therein. Bypass door 468 is pivotally mounted on side panel 82 by any convenient fashion, such as hinge joints (not shown) to be pivotable between a first position wherein bypass door 468, due to its shape and size, fully closes inlet aperture 466, thereby causing all air which enters inlet compartment 66 to pass through the centrifugal separator tubes 42. When bypass door 468 is actuated to its open position, the air may enter inlet compartment 66 through inlet opening 466 without passing through the centrifugal separators 42. The bypass doors of the FIGS. 27–29 constructions may be operated in any convenient fashoin, such as pilot operated electric or hydraulic motors.

Other modifications of the engine inlet air particle separator are shown in FIGS. 30–32. These separators are generally of the type described in connection with FIGS. 2, 3, 4, 6 and 7, except that the filter panels are mounted so as to be movable. As best shown in FIG. 30, this modification of separator assembly 24 includes a top filter panel 470 and two-side filter panels 472 and 474, each of which are pivotally mounted by any convenient method, such as hinge joints 476 and 478 in support frame and scavenge duct system 450, to be movable between a first position shown in FIG. 30 wherein the filter panels 472, 470 and 474 completely fill the apertures 480, 482 and 484 in frame 450 when separator assembly 24 is in the inlet filtration mode of operation so that all air entering inlet compartment 66 must pass through the centrifugal separator tubes 42. The filter panels 470, 472 and 474 may be pivoted to their FIG. 31 open positions for bypass operation during which air may enter inlet compartment 66 through any of the apertures 480, 482 or 484.

The FIG. 32 construction differs from the FIG. 30–31 constructions in that the filter panels 470, 472 and 474 are pivotally attached to the after or downstream end of frame 450, whereas the filter panels are attached to the forward or upstream end of frame 450 in the FIG. 30–31 constructions.

If sealing is required between the movable filter panels and frame member 450 in the FIG. 30–32 constructions, it will be evident that such sealing may be of the peripheral seal design illustrated in FIG. 33, wherein peripheral seals 500 and 502 of the outer wall 504 of frame 450 coact with peripheral seals 506 and 508 of the outer walls 44 of movable filter panels 470 and 474. In similar fashion, peripheral seals 510 and 512 of the inner wall 514 of frame 450 coact with peripheral seals 516 and 518 of the inner walls 46 of movable panel members 470 and 474. The peripheral seals are preferably made of rubber, Teflon, nylon or the like.

The construction shown in FIGS. 34–36 is another modification of the engine inlet air particle separator. This construction is generally similar to the constructions previously described in connection with FIGS. 2, 3, 4, 6 and 7 as well as 30–32, except that while top filter panel 520 is fixed, side panels 522 and 524, which may or may not be filter panels, are pivotally mounted to frame and scavenge duct system 450. Another difference in this construction from the previously described constructions is that the back wall member 530 is made of top portion 532 and bottom portion 534, each of which is pivotally attached by any convenient method such as hinge joints 536 and 538 to frame 450. It will be noted by observing FIGS. 34–36 that side panels 522 and 524 may be pivoted between their FIG. 34–35 closed positions wherein they form part of the filtration system to their FIG. 36 open position, wherein they provide openings into inlet compartment 66 through apertures 540 and 542 in frame 450. This modfiication of the engine inlet air particle separator is shown in its complete filtration mode of operation in FIG. 34, wherein all air entering engine inlet compartment 66 must pass through the centrifugal separator tubes 42 in the filter panels 520, 522 and 524. If bypass operation is desired, either side panels 522 and 524 may be pivoted to their FIG. 36 positions and back wall members 532 and 534 may be left in their FIG. 34 position or back wall member 532 and 534 may also be pivoted to their FIG. 35–36 position, thereby permitting bypass airflow into engine inlet compartment 66 without passing through the tubes 42.

With filter assembly 24 in the bypass mode of operation illustrated in either FIG. 35 or 36, it will be noted that atmospheric air must flow through a circuitous route around portions of filter assembly 24 to enter the engine inlet and therefore large particles, such as ice, will be separated from the atmospheric air and will not enter the engine inlet. It is considered particularly desirable to place back wall members 532 and 534 into their FIG. 35 or FIG. 36 positions during bypass operation because ice would build up thereon, if they remained in their FIG. 34 position and would soon cause ice flow into the engine inlet due to the proximity between the engine inlet and wall members 532 and 534.

It is to be understood that the invention is not limited to the specific embodiment herein illustrated and described but may be used in other ways without departure from its spirit as defined by the following claims.

I claim:
1. An air filter adapted to be attached to the inlet of an air breathing engine and including:
 (a) an inner wall member shaped to define a passageway therewithin having an inlet opening and an outlet opening adapted to be connected to an air breathing engine inlet in axial alignment,
 (b) an outer wall member communicating with atmosphere and enveloping said inner wall member and spaced therefrom to define a chamber therebetween,
 (c) a plurality of centrifugal separator tube members each extending between and through said wall members and having an inlet connected to said outer wall to communicate with atmosphere external of said outer wall member and also having a clean air outlet connected to said inner wall and communicating with said passageway within said inner wall member and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said passageway,
 (d) means connecting said wall members to said separator tube members and to each other so that the only gas flow paths between said wall members is through said separator tube members,
 (e) scavenge means connected to said chamber and applying a suction thereto to scavenge the separated material therefrom,
 (f) and door means positioned in said inlet opening of said inner wall member and mounted and shaped to be movable between a first position to block air flow into said passageway so that all air entering said passageway must pass through said centrifugal separator tube members and a second position to permit air flow through said inlet opening and into said passageway.
2. Apparatus according to claim 1 wherein said outer and inner wall members are concentric cylinders mounted about an axis adapted to be in substantial alignment with the engine inlet axis.

3. Apparatus according to claim 1 and including a coarse filter member enveloping said plurality of centrifugal separator tubes.

4. Apparatus according to claim 3 and including a plurality of cowl flaps mounted externally of said coarse filter member to be pivotable between a first position wherein said cowl flaps coact to form a smooth cover over said coarse filter member and a second position wherein the cowl flaps form passages therebetween placing said filter tube members into communication with atmosphere.

5. Apparatus according to claim 1 and including means to pass heated air through said chamber for anti-icing purposes.

6. Apparatus according to claim 1 and including an aircraft having an engine with an engine inlet, and means to mount said filter to be positioned forward of said engine so that said passageway communicates with said engine inlet.

7. Apparatus according to claim 1 wherein said separator tube members are tilted with respect to the engine axis so as to be inclined in a forward direction to receive atmospheric air with ram effect.

8. An engine inlet air particle separator adapted to filter foreign objects from the air entering the inlet of an air breathing engine including:
 (a) top, bottom and two side filter panels connected to form a passageway about an axis and having an open inlet and an open outlet adapted to be positioned forward of and connected to the engine inlet,
 (b) two central filter panels positioned in the center of said passageway,
 (c) means pivotally mounting said central panels to be movable between a first position wherein each central filter panel extends along said axis and a second position wherein the central filter panels coact to form a V extending between said other panels and across said passageway,
 (d) each of said panels including:
   (1) an outer wall communicating with atmosphere,
   (2) an inner wall communicating with said passageway and spaced from said outer wall to form a chamber therebetween,
   (3) a plurality of centrifugal separator tube members each extending between and through said inner and outer walls and having an inlet connected to said outer wall to communicate with atmosphere external of said outer wall and also having a clean air outlet connected to said inner wall and communicating with said passageway within said inner wall and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said passageway,
   (4) and means connecting said wall members to said separator tube members and to each other so that the only gas flow paths between said wall members is through said separator tube members,
 (e) and bypass door means shaped and adapted to be moved along said axis between a first position wherein the door means blocks said inlet of said passageway and a second position wherein the door means is positioned in spaced relation axially forward of said open inlet of said passageway so that a circuitous air flow path is defined between said door means when in said second position and said inlet whereby said filter may operate in a filtration mode without anti-icing when said bypass door is in said first position and said central filter panels are in said first position so that all air entering said passageway must pass through said separator tube members in said top and bottom and side panels, and further whereby said filter may operate in a filtration mode with anti-icing when said bypass doors are in said second position so that the air entering said passageway may follow the circuitous air flow path between said bypass doors and said open end of said passageway and then through the filter tube members of said central filter panels into said passageways, and still further whereby said filter may operate in an unfiltered mode with anti-icing when said bypass doors are in said second position and said central filter panels are in said first position so that air may enter said passageway by following the circuitous air flow path between the bypass doors and the open inlet of said passageway.

9. Apparatus according to claim 8 and including suction means connected to said chambers to scavenge the separated foreign particles therefrom.

10. In an aircraft having:
 (a) an engine with an air inlet,
 (b) an engine inlet air particle separator positioned in front of and in substantial alignment with the engine inlet and including:
   (1) spaced outer and inner walls defining a compartment within the inner wall and at least one chamber between the inner and outer walls,
   (2) a plurality of tube-shaped centrifugal separators attached to and extending between said inner and outer spaced walls, said centrifugal separators having an inlet at the outer wall communicating with particle-ladened atmospheric air, having a clean air outlet at the inner wall and a separated particle outlet into said chamber and having means to apply centrifugal force to the particle-ladened air positioned between the inlet and the separated particle outlet to separate foreign particles from the air passing between said inlet and said separated particle outlet into said chamber and so that clean air will enter said compartment through said clean air outlet,
   (3) means connecting said spaced walls to said separators and to each other so that the only gas flow paths between said spaced walls is through said separators,
   (4) means sealably connecting said separator to the engine inlet,
   (5) suction means connected to said chamber to scavenge the separated particles from the chamber,
   (6) and bypass means to permit atmospheric air into said compartment and engine inlet without passing through said tubes.

11. Apparatus according to claim 10 and wherein said bypass means is a valve means.

12. In combination with an aircraft having at least one engine with an engine air inlet, and engine inlet air particle separator comprising a closed box-like container defining a first ductway therewithin and said container having at least three sides which are formed of inner and outer spaced walls forming a second ductway therebetween, a plurality of centrifugal separator tube members each extending between and through said walls and having an inlet connected to said outer wall to communicate with atmosphere external of said outer wall member and also having a clean air outlet connected to said inner wall and communicating with said first ductway within said inner wall member and further having a separated particle outlet into said second ductway, and still further having means to apply centrifugal force to the atmospheric air between said inlet and said separated particle outlet so that material separated from the atmospheric air in passing through said centrifugal force applying means will enter said second ductway and clean air will enter said first ductway, means connecting said walls to said separator tube members and to each other so that the only gas flow paths between said walls is through said separator tube members, suction means communicating with said second ductway and exhausting exterior to said container to remove separated particles from said second ductway, said container having a first opening at one end adjacent to and substantially equal in area to said engine air inlet and a second opening at the other end away from the engine air inlet, means sealing between said container first opening and said engine air inlet, bypass door means located in said second opening, and means to open said bypass door means to permit air to enter said engine air inlet through said second opening and said first ductway.

13. An engine inlet air filtration apparatus for an aircraft comprising:
  (a) a duct having:
    (1) inner and outer spaced walls shaped to define a chamber between said walls and a passageway within said inner wall and with said outer wall adapted to be exposed to particle-ladened ambient air,
    (2) an open first end defining one end of the passageway and adapted to be exposed to particle-ladened ambient air,
    (3) an open second end defining the other end of the passageway and adapted to be connected to an engine inlet,
  (b) a plurality of centrifugal particle separator tube members mounted between said outer and inner walls and having a particle-ladened ambient air inlet connected to said outer wall, a clean air outlet connected to said inner wall, and a separated particle-ladened outlet into said chamber and further having means to apply centrifugal force to the particle-ladened air between said tube inlet and said separated particle-ladened outlet so that separated particles will enter said chamber and cleaned air will enter said passageway,
  (c) means connecting said walls to said separator tube members and to each other so that the only gas flow paths between said walls is through said separator tube members,
  (d) means for scavenging the separated particles from said chamber,
  (e) and valve means operably connected to said open first end of said duct and having a closed position to cause the particle-ladened ambient air to enter the duct passageway through the particle separator tube members only and an open position to permit the particle-ladened ambient air to enter said passageway directly through said open first end of said duct.

14. Apparatus according to claim 13 including means to actuate the valve means between closed and open positions.

15. In an air breathing engine having:
  (a) an annular inlet and an axis,
  (b) an engine inlet air particle separator positioned forward of said inlet and including:
    (1) a first wall member of circular cross section and concentric about said axis,
    (2) a second wall member enveloped within and spaced from said first wall member and being of circular cross section and concentric about said axis to define an annular chamber therebetween,
    (3) means joining said first and second wall members so that said annular chamber is airtight,
    (4) a third wall member enveloped within said second wall member and spaced therefrom and being of circular cross section and concentric about said axis and coacting with said second wall member to define an annular passageway therebetween having an annular inlet and an annular outlet engaging said engine annular inlet,
    (5) a plurality of centrifugal separator tube members each extending between and through said first and second wall members and having an inlet connected to said first wall member to communicate with atmosphere external of said first wall member and also having a clean air outlet connected to said second wall member and communicating with said annular passageway within said second wall member and further having a separated particle outlet into said annular chamber, and still further having means to apply centrifugal force to the atmospheric air between said inlet and said separated particle outlet so that material separated from the atmospheric air in passing through said centrifugal force applying means will enter said annular chamber and clean air will enter said annular passageway,
    (6) suction means connected to said annular chamber and operable to scavenge the separated foreign material deposited therein,
    (7) and valve means located in said annular inlet and operable between a first position wherein said valve means blocks air flow into said annular passageway through said annular inlet and a second position wherein air flow is permitted into said annular passage through said annular inlet.

16. Apparatus according to claim 15 wherein said third wall member defines an engine accessory chamber therewithin forward of said engine, and including a fourth wall member enveloped within said third wall member and being of circular cross section and concentric about said axis and defining a cooling air passage therewithin having an inlet communicating with atmosphere and an outlet communicating with said engine accessory chamber, and further including engine accessories mounted in said engine accessory chamber so that ram air may pass through said cooling air passage and pass over said engine accessories.

17. Apparatus according to claim 15 wherein said filter tube members are tilted with respect to said axis so as to be inclined in a forward direction to receive atmospheric air with ram effect.

18. In an air breathing engine having:
  (a) an annular inlet and an axis,
  (b) an engine inlet air particle separator positioned forward of said inlet and including:
    (1) a first wall member of circular cross section and concentric about said axis,
    (2) a second wall member enveloped within and spaced from said first wall member and being of circular cross section and concentric about said axis to define an annular chamber therebetween,
    (3) means joining said first and second wall members so that said annular chamber is airtight,
    (4) a third wall member enveloped within said second wall member and spaced therefrom and being of circular cross section and concentric about said axis and coacting with said second wall member to define an annular passageway therebetween having an annular inlet and an annular outlet engaging said engine annular inlet,
    (5) a plurality of centrifugal separator tube members each extending between and through said wall members and having an inlet connected to said outer wall to communicate with atmosphere external of said outer wall member and also having a clean air outlet connected to said inner wall and communicating with said passageway within said inner wall member and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said passageway, (6) suction means connected to said annular chamber and operable to scavenge the separated foreign material deposited therein, (7) and valve means located in said annular inlet and operable between a first position wherein said valve means blocks air flow into said annular passageway through said annular inlet and a second position wherein air flow is permitted into said annular passage through said annular inlet and, wherein said third wall members extend axially forward of said second wall member and wherein said second and third wall members diverge outwardly in a downstream direction with respect to said axis, and further wherein said valve means is an annular member diverging with respect to said axis in a downstream direction, and wherein said valve member is reciprocated axially between a first position wherein the valve member extends between the axially separated forward ends of said second and third wall members to block air flow into said annular passageway and a second position wherein the valve member bears against the divergent portion of the third member to permit air flow into said annular passageway.

19. In an air breathing engine having:
(a) an annular inlet and an axis,
(b) an engine inlet air particle separator positioned forward of said inlet and including:
  (1) a first wall member of circular cross section and concentric about said axis,
  (2) a second wall member enveloped within and spaced from said first wall member and being of circular cross section and concentric about said axis to define an annular chamber therebetween,
  (3) means joining said first and second wall members so that said annular chamber is airtight,
  (4) a third wall member enveloped within said second wall member and spaced therefrom and being of circular cross section and concentric about said axis and coacting with said second wall member to define an annular passageway therebetween having an annular inlet and an annular outlet engaging said engine annular inlet,
  (5) a plurality of centrifugal separator tube members each extending between and through said wall members and having an inlet connected to said outer wall to communicate with atmosphere external of said outer wall member and also having a clean air outlet connected to said inner wall and communicating with said passageway within said inner wall member and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said passageway,
  (6) suction means connected to said annular chamber and operable to scavenge the separated foreign material deposited therein,
  (7) and valve means located in said annular inlet and operable between a first position wherein said valve means blocks air flow into said annular passageway through said annular inlet and a second position wherein air flow is permitted into said annular passage through said annular inlet and, wherein said third wall member defines an engine accessory chamber therewithin forward of said engine, and including a fourth wall member enveloped within said third wall member and being of circular cross section and concentric about said axis and defining a cooling air passage therewithin having an inlet communicating with atmosphere and an outlet communicating with said engine accessory chamber, and further including engine accessories mounted in said engine accessory chamber so that ram air may pass through said cooling air passage and pass over said engine accessories, and including air pumping means located in said cooling air passage to draw cooling air therethrough and positioned to direct the cooling air over said engine accessories.

References Cited

UNITED STATES PATENTS

| | | | |
|---|---|---|---|
| 821,201 | 5/1906 | Taylor | 98—87 |
| 1,467,826 | 9/1923 | Bumbarger | 98—87 |
| 1,659,880 | 2/1928 | Kaufman | 98—110 |
| 1,989,010 | 1/1935 | Howard | 98—113 |
| 2,158,273 | 5/1939 | Chilton | 244—53.5 |
| 2,381,705 | 8/1945 | Vokes | 55—306 |
| 2,552,847 | 5/1951 | Farr et al. | 55—484 |
| 2,583,921 | 1/1952 | Yellott | 55—348 |
| 2,590,952 | 4/1952 | Fukal | 98—110 |
| 2,636,666 | 4/1953 | Lombard | 55—306 |
| 2,641,902 | 6/1953 | Kerr | 60—270 |
| 2,711,631 | 6/1955 | Willgoos | 60—39.37 |
| 2,747,367 | 5/1956 | Savin | 60—39.16 |
| 2,764,390 | 9/1956 | Harris | 55—269 |
| 2,911,065 | 11/1959 | Yellott et al. | 55—274 |
| 2,928,497 | 3/1960 | Stockdale | 55—306 |
| 2,944,631 | 7/1960 | Kerry et al. | 55—306 |
| 2,960,281 | 11/1960 | Jumelle et al. | 244—53.8 |
| 3,135,487 | 6/1964 | Kottsieper | 248—5 |
| 3,201,070 | 8/1965 | Chilvers | 244—54 |
| 3,302,396 | 2/1967 | Robbins | 60—39.09 |
| 3,309,867 | 3/1967 | Ehrich | 60—39.09 |
| 3,347,496 | 10/1967 | Opfer | 60—269 |

FOREIGN PATENTS

| | | |
|---|---|---|
| 153,184 | 9/1953 | Australia. |
| 124,101 | 5/1947 | Australia. |
| 251,179 | 4/1964 | Australia. |
| 1,299,917 | 6/1962 | France. |
| 760,513 | 10/1956 | Great Britain. |
| 760,669 | 11/1956 | Great Britain. |
| 926,317 | 5/1963 | Great Britain. |

HARRY B. THORNTON, *Primary Examiner.*

BERNARD NOZICK, *Assistant Examiner.*

U.S. Cl. X.R.

55—314, 337, 347, 348, 456; 209—144; 60—39.09; 244—53; 98—121